United States Patent
Murgatroyd et al.

(10) Patent No.: US 11,479,672 B2
(45) Date of Patent: Oct. 25, 2022

(54) HIGH WET FAST DISPERSE DYE MIXTURES OF N-[4-(5-THIOCYANATO-2,4-DINITRO-PHENYLAZO)-PHENYL]-AMINE DERIVATIVES AND N-[4-(4-NITRO-PHENYLAZO)-PHENYL]-AMINE DERIVATIVES

(71) Applicant: DyStar Colours Distribution GmbH, Raunheim (DE)

(72) Inventors: Adrian Murgatroyd, Macclesfield (GB); Manfred Hoppe, Kürten (DE); Clemens Grund, Hattersheim (DE); Fanny Vermandel, Wiesbaden (DE); Chongjun Jiao, Shanghai (CN)

(73) Assignee: DYSTAR COLOURS DISTRIBUTION GMBH, Raunheim (DE)

(*) Notice: Subject to any disclaimer, the term of this patent is extended or adjusted under 35 U.S.C. 154(b) by 0 days.

(21) Appl. No.: 17/442,953

(22) PCT Filed: Mar. 12, 2020

(86) PCT No.: PCT/EP2020/056623
§ 371 (c)(1),
(2) Date: Sep. 24, 2021

(87) PCT Pub. No.: WO2020/193160
PCT Pub. Date: Oct. 1, 2020

(65) Prior Publication Data
US 2022/0098416 A1    Mar. 31, 2022

(30) Foreign Application Priority Data
Mar. 27, 2019 (EP) .................. 19165505

(51) Int. Cl.
*C09B 67/00* (2006.01)
*C09B 67/22* (2006.01)

(52) U.S. Cl.
CPC ................ *C09B 67/0051* (2013.01)

(58) Field of Classification Search
CPC ........... C09B 67/0051; C09B 67/0055; C09B 67/0029; C09B 29/0816; C09B 45/14; C07C 217/97
USPC .......................................................... 8/456
See application file for complete search history.

(56) References Cited

U.S. PATENT DOCUMENTS

| | | | |
|---|---|---|---|
| 4,140,684 A | 2/1979 | Burkhard | |
| 4,379,819 A | 4/1983 | Lenoir et al. | |
| 4,619,993 A * | 10/1986 | Baumann | C09B 29/3686 534/735 |
| 2014/0123407 A1 * | 5/2014 | Arnold | C09B 67/0082 8/641 |
| 2015/0344695 A1 * | 12/2015 | Vermandel | D06P 3/6041 8/543 |
| 2016/0312403 A1 * | 10/2016 | Zhao | D06P 1/19 |

FOREIGN PATENT DOCUMENTS

| | | | |
|---|---|---|---|
| DE | 1544446 A1 | 11/1969 | |
| DE | 209641 A5 | 5/1984 | |
| DE | 19646429 A1 | 5/1997 | |
| EP | 0440072 A1 | 8/1991 | |
| EP | 0555179 A1 | 8/1993 | |
| EP | 0864615 A1 * | 9/1998 | C09B 67/22 |
| EP | 0894830 A2 | 2/1999 | |
| GB | 1095829 A | 12/1967 | |
| GB | 2020680 A | 11/1979 | |
| GB | 2300863 A | 11/1996 | |
| WO | 02/81572 A1 | 10/2002 | |
| WO | 2005/040283 A2 | 5/2005 | |
| WO | 2005/056690 A1 | 6/2005 | |
| WO | 2006/131530 A1 | 12/2006 | |
| WO | 2016/041849 A1 | 3/2016 | |

OTHER PUBLICATIONS

STIC Search Report dated Jan. 3, 2022.*
International Search Report and Written Opinion received for PCT Patent Application No. PCT/EP2020/056623, dated Apr. 21, 2020, 10 pages.

* cited by examiner

*Primary Examiner* — Eisa B Elhilo
(74) *Attorney, Agent, or Firm* — Faegre Drinker Biddle & Reath LLP

(57) ABSTRACT

The present invention is directed to dye mixtures comprising dyes of formula (1) and dyes of formula (2), the process of the production and the use of the dye mixtures.

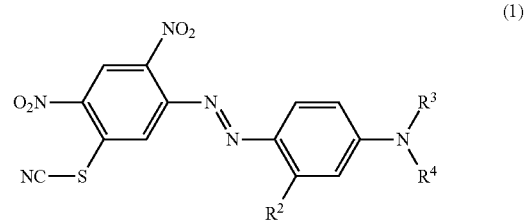

(1)

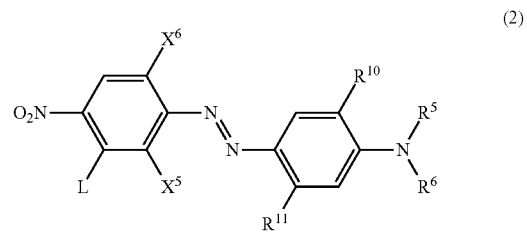

(2)

13 Claims, No Drawings

HIGH WET FAST DISPERSE DYE MIXTURES OF N-[4-(5-THIOCYANATO-2,4-DINITRO-PHENYLAZO)-PHENYL]-AMINE DERIVATIVES AND N-[4-(4-NITRO-PHENYLAZO)-PHENYL]-AMINE DERIVATIVES

CROSS-REFERENCE TO RELATED APPLICATIONS

This application is a national stage application (under 35 U.S.C. § 371) of PCT/EP2020/056623, filed Mar. 12, 2020, which claims benefit of European Application No. 19165505.9, filed Mar. 27, 2019, both of which are incorporated herein by reference in their entirety.

This invention relates to high wet fast Rhodano-Disperse azo dye mixtures.

Disperse-azo-dyes (1) with the substitution pattern 2,4,5—in the diazo-component are known e.g. from U.S. Pat. No. 4,619,993, DD209641, GB 2 020 680, U.S. Pat. No. 4,379,819, WO 2005/056690, WO 2005/040283 and WO 2016/041849. Dyes with general Structure (2) and their mixtures are also known, —e.g. from EP 0 864 615, EP 0 894 830, EP 0 555 179, WO 2006/131530 and WO 2002/081572, but they have unsatisfactory build up properties for deeper shades and/or insufficient wash- and contact-fastnesses.

It was now found that certain combinations of azo dyes of the formula (1) together with dyes of formula (2) result in improved build up and good wash- and contact-fastness properties on polyester and polyester blends especially on polyester-elastane/polyester-spandex.

The present invention thus is directed to a dye mixture comprising at least one dye of formula (1)

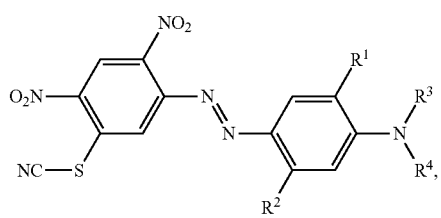

wherein independent of each other
$R^1$ is hydrogen, $(C_1$-$C_4)$-alkyl or $(C_1$-$C_4)$-alkoxy,
$R^2$ is hydrogen, carboxy, $(C_1$-$C_4)$-alkyl, halogen, acylamino, —NHCO-aryl, —NHCO-benzyl or sulfonylamino,
$R^3$ and $R^4$ is hydrogen, $(C_1$-$C_4)$-alkyl, $(CH_2)_n$-phenyl, $CH_2$—$CH$=$CH_2$, $(CH_2)_n$—OH, $(CH_2)_n$—O—$(C_1$-$C_4)$-alkyl, $(CH_2)_n$—O-phenyl, $(CH_2)_n$—O-benzyl, $(CH_2)$—O—$(CH_2)_m$—OH, $(CH_2)$—O—$(CH_2)_m$—O—$(C_1$-$C_4)$-alkyl, $(CH_2)_n$—O—$(CH_2)_m$—O-phenyl, $(CH_2)$—O—$(CH_2)_m$—O-benzyl, $(CH_2)_n$—COOH, $(CH_2)_n$—COO—$(C_1$-$C_4)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1$-$C_4)$-alkyl, $(CH_2)_n$—COO$(CH_2)_m$—CO-benzyl, $(CH_2)_n$—O—CO—$(C_1$-$C_4)$-alkyl, $(CH_2)_n$—O—CO-phenyl, $(CH_2)_n$—O—CO-benzyl, COO—$(CH_2)_n$-2-furfuryl, $(CH_2)_m$—O—$(CH_2)_n$-2-furfuryl, $CHR^9$—$(CH_2)$—$(C_1$-$C_4)$-alkyl, $CHR^9$—$(CH_2)_p$ phenyl, $CHR^9$—$CH$=$CH_2$, $CHR^9$—$(CH_2)_p$—OH, $CHR^9$—$(CH_2)_p$—O—$(C_1$-$C_4)$-alkyl, $CHR^9$—$(CH_2)_p$—O-phenyl, $CHR^9$—$(CH_2)_p$—O-benzyl, $CHR^9$—$(CH_2)_p$—O—$(CH_2)_m$—OH, $CHR^9$—$(CH_2)_p$—O—$(CH_2)_m$—O—$(C_1$-$C_4)$-alkyl, $CHR^9$—$(CH_2)_p$—O—$(CH_2)_m$—O-phenyl, $CHR^9$—$(CH_2)_p$—O—$(CH_2)_m$—O-benzyl, $CHR^9$—$(CH_2)_p$—COOH, $CHR^9$—$(CH_2)_p$—COO—$(C_1$-$C_4)$-alkyl, $CHR^9$—$(CH_2)_p$—COO-phenyl, $CHR^9$—$(CH_2)_p$—COO-benzyl, $CHR^9$—$(CH_2)_p$—CN, $CHR^9$—$(CH_2)_p$—COO$(CH_2)_m$—CO—$(C_1$-$C_4)$-alkyl, $CHR^9$—$(CH_2)_p$—COO$(CH_2)_m$—CO-phenyl, $CHR^9$—$(CH_2)_p$—COO$(CH_2)_m$—CO-benzyl, $CHR^9$—$(CH_2)_p$—O—CO—$(C_1$-$C_4)$-alkyl, $CHR^9$—$(CH_2)_p$—O—CO-phenyl, $CHR^9$—$(CH_2)_p$—O—CO-benzyl, $CHR^9$—$(CH_2)_p$-2-furfuryl or $CHR^9$—$(CH_2)_p$—O—$(CH_2)_n$-2-furfuryl,
wherein
$R^9$ is $(C_1$-$C_4)$-alkyl or $(C_1$-$C_4)$-alkyl substituted by —OH or halogen,
n is 1 to 4,
m is 1 to 4 and
p is 0 to 3,
with the proviso that at least one of $R^3$ and $R^4$ is not hydrogen,
and
at least one dye of formula (2)

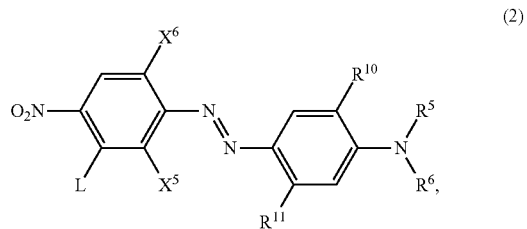

wherein independent of each other
$R^5$ and $R^6$ is hydrogen, $(C_1$-$C_4)$-alkyl, $(CH_2)_n$-phenyl, $CH_2$—$CH$=$CH_2$, $(CH_2)_n$—OH, $(CH_2)_n$—O—$(C_1$-$C_4)$-alkyl, $(CH_2)_n$—O-phenyl, $(CH_2)_n$—O-benzyl, $(CH_2)_n$—O—$(CH_2)_m$—OH, $(CH_2)_n$—O—$(CH_2)_m$—O—$(C_1$-$C_4)$-alkyl, $(CH_2)_n$—O—$(CH_2)_m$—O-phenyl, $(CH_2)_n$—O—$(CH_2)_m$—O-benzyl, $(CH_2)_n$—COOH, $(CH_2)_n$—COO—$(C_1$-$C_4)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1$-$C_4)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1$-$C_4)$-alkyl, $(CH_2)_n$—O—CO-phenyl, $(CH_2)_n$—O—CO-benzyl, COO—$(CH_2)_n$-2-furfuryl or $(CH_2)_m$—O—$(CH_2)_n$-2-furfuryl,
wherein
n is 1 to 4 and
m is 1 to 4,
with the proviso that at least one of $R^5$ and $R^6$ is not hydrogen,
$R^{10}$ is hydrogen, $(C_1$-$C_4)$-alkyl or $(C_1$-$C_4)$-alkoxy,
$R^{11}$ is hydrogen, carboxy, $(C_1$-$C_4)$-alkyl, halogen, acylamino, —NHCO-aryl, —NHCO-benzyl or sulfonylamino,
$X^5$ and $X^6$ is hydrogen, halogen, nitro or cyano,
with the proviso that at least one of $X^5$ and $X^6$ is not hydrogen
and
L is hydrogen or
in case $X^6$ is nitro and $X^5$ is hydrogen L is hydrogen or fluoro.

Regarding both, dyes of formula (1) as well as dyes of formula (2), there exist preferred ones to form overall preferred combinations:

As to the selection of dyes of formula (1) a dye mixture as described above is preferred, wherein independent of each other in the at least one dye of formula (1)

$R^1$ is hydrogen, methyl or methoxy, $R^2$ is hydrogen, hydroxy, COOH, COO—($C_1$-$C_2$)-alkyl, ($C_1$-$C_2$)-alkyl, —NHCO—($C_1$-$C_2$)-alkyl, —NHCO-aryl, —NHCO-benzyl or —NHSO$_2$—($C_1$-$C_2$)-alkyl, $R^3$ and $R^4$ is hydrogen, ($C_1$-$C_2$)-alkyl, (CH$_2$)-phenyl, CH$_2$—CH=CH$_2$, (CH$_2$)$_2$—O—($C_1$-$C_2$)-alkyl, (CH$_2$)$_2$—O-phenyl, (CH$_2$)$_2$—O-benzyl, (CH$_2$)$_2$—O—(CH$_2$)$_m$—O—($C_1$-$C_2$)-alkyl, (CH$_2$)$_2$—O—(CH$_2$)$_m$—O-phenyl, (CH$_2$)$_2$—O—(CH$_2$)$_m$—O-benzyl, (CH$_2$)$_n$—COO—($C_1$-$C_2$)-alkyl, (CH$_2$)$_n$—COO-phenyl, (CH$_2$)$_n$—COO-benzyl, (CH$_2$)$_n$—CN, (CH$_2$)$_n$—COO(CH$_2$)$_m$—CO—($C_1$-$C_2$)-alkyl, (CH$_2$)$_n$—COO(CH$_2$)$_m$—CO-benzyl, (CH$_2$)$_n$—O—CO—($C_1$-$C_2$)-alkyl, (CH$_2$)$_n$—O—CO-phenyl, (CH$_2$)$_n$—O—CO-benzyl, COO—(CH$_2$)$_n$-2-furfuryl, (CH$_2$)$_m$—O—(CH$_2$)$_n$-2-furfuryl, CHR$^9$—CH=CH$_2$, CHR$^9$—(CH$_2$)$_p$—O—($C_1$-$C_2$)-alkyl, CHR$^9$—(CH$_2$)$_p$—O-phenyl, CHR$^9$—(CH$_2$)$_p$—O-benzyl, CHR$^9$—(CH$_2$)$_p$—O—(CH$_2$)$_m$—O—($C_1$-$C_2$)-alkyl, CHR$^9$—(CH$_2$)$_p$—O—(CH$_2$)$_m$—O-phenyl, CHR$^9$—(CH$_2$)$_p$—O—(CH$_2$)$_m$—O-benzyl, CHR$^9$—(CH$_2$)$_p$—COO—($C_1$-$C_2$)-alkyl, CHR$^9$—(CH$_2$)$_p$—COO-phenyl, CHR$^9$—(CH$_2$)$_p$—COO-benzyl, CHR$^9$—(CH$_2$)$_p$—CN, CHR$^9$—(CH$_2$)$_p$—COO(CH$_2$)$_m$—CO—($C_1$-$C_2$)-alkyl, CHR$^9$—(CH$_2$)$_p$—COO(CH$_2$)$_m$—CO-phenyl, CHR$^9$—(CH$_2$)$_p$—COO(CH$_2$)$_m$—CO-benzyl, CHR$^9$—(CH$_2$)$_p$—O—CO—($C_1$-$C_2$)-alkyl, CHR$^9$—(CH$_2$)$_p$—O—CO-phenyl or CHR$^9$—(CH$_2$)$_p$—O—CO-benzyl, wherein $R^9$ is ($C_1$-$C_4$)-alkyl or ($C_1$-$C_4$)-alkyl substituted by —OH or halogen, n is 1 or 2, m is 1 or 2 and p is 0 or 1, with the proviso that at least one of $R^3$ and $R^4$ is not hydrogen.

More preferred is a dye mixture as described above, wherein independent of each other in the at least one dye of formula (1)

$R^1$ is hydrogen or methoxy, $R^2$ is hydrogen, methyl or —NHCO—($C_1$-$C_2$)-alkyl, $R^3$ and $R^4$ is hydrogen, ($C_1$-$C_2$)-alkyl, (CH$_2$)-phenyl, CH$_2$—CH=CH$_2$, (CH$_2$)$_2$—O—($C_1$-$C_2$)-alkyl, (CH$_2$)$_2$—O-phenyl, (CH$_2$)$_2$—O-benzyl, (CH$_2$)$_2$—O—(CH$_2$)$_m$—O—($C_1$-$C_2$)-alkyl, (CH$_2$)$_n$—COO—($C_1$-$C_2$)-alkyl, (CH$_2$)$_n$—COO-phenyl, (CH$_2$)$_n$—COO-benzyl, (CH$_2$)$_n$—CN, (CH$_2$)$_n$—COO (CH$_2$)$_m$—CO—($C_1$-$C_2$)-alkyl, (CH$_2$)$_n$—COO(CH$_2$)$_m$—CO-benzyl, (CH$_2$)$_n$—O—CO—($C_1$-$C_2$)-alkyl, (CH$_2$)$_n$—O—CO-phenyl, COO—(CH$_2$)$_n$-2-furfuryl or (CH$_2$)$_m$—O—(CH$_2$)$_n$-2-furfuryl, CHR$^9$—(CH$_2$)$_p$—COO—($C_1$-$C_2$)-alkyl, wherein $R^9$ is ($C_1$-$C_4$)-alkyl n is 1 or 2, m is 1 or 2 and with the proviso that at least one of $R^3$ and $R^4$ is not hydrogen.

A dye mixture as described above, wherein the at least one dye of formula (1) is a dye of formula (1a)

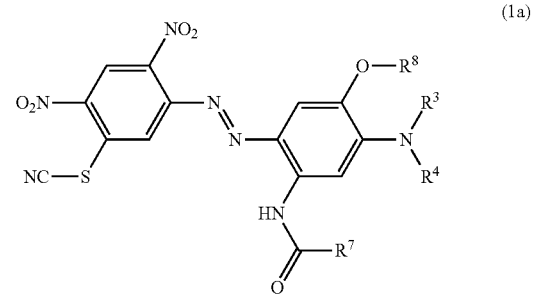

(1a)

wherein independent from each other $R^3$ and $R^4$ is hydrogen, ($C_1$-$C_2$)-alkyl, (CH$_2$)-phenyl, CH$_2$—CH=CH$_2$, (CH$_2$)$_2$—O—($C_1$-$C_2$)-alkyl, (CH$_2$)$_2$—O-phenyl, (CH$_2$)$_2$—O-benzyl, (CH$_2$)$_2$—O—(CH$_2$)$_m$—O—($C_1$-$C_2$)-alkyl, (CH$_2$)$_n$—COO—($C_1$-$C_2$)-alkyl, (CH$_2$)$_n$—COO-phenyl, (CH$_2$)$_n$—COO-benzyl, (CH$_2$)$_n$—CN, (CH$_2$)$_n$—COO (CH$_2$)$_m$—CO—($C_1$-$C_2$)-alkyl, (CH$_2$)$_n$—COO(CH$_2$)$_m$—CO-benzyl, (CH$_2$)$_n$—O—CO—($C_1$-$C_2$)-alkyl, (CH$_2$)$_n$—O—CO-phenyl, COO—(CH$_2$)$_n$-2-furfuryl, (CH$_2$)$_m$—O—(CH$_2$)$_n$-2-furfuryl or CHR$^9$—(CH$_2$)$_p$—COO—($C_1$-$C_2$)-alkyl, wherein $R^9$ is ($C_1$-$C_4$)-alkyl, n is 1 or 2, m is 1 or 2 and p is 0 or 1, with the proviso that at least one of $R^3$ and $R^4$ is not hydrogen and $R^7$ and $R^8$ is ethyl or methyl, forms a preferred embodiment of the present invention.

A dye mixture as described above, wherein the at least one dye of formula (1) is a dye of formula (1b)

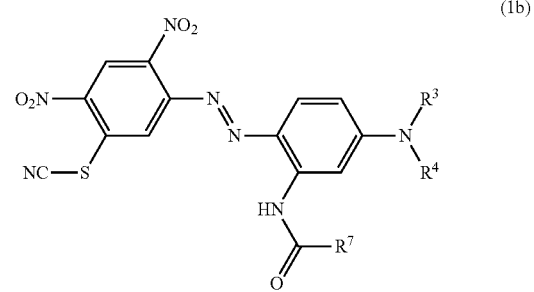

(1b)

wherein independent from each other $R^3$ and $R^4$ is hydrogen, ($C_1$-$C_2$)-alkyl, (CH$_2$)-phenyl, CH$_2$—CH=CH$_2$, (CH$_2$)$_2$—O—($C_1$-$C_2$)-alkyl, (CH$_2$)$_2$—O-phenyl, (CH$_2$)$_2$—O-benzyl, (CH$_2$)$_2$—O—(CH$_2$)$_m$—O—($C_1$-$C_2$)-alkyl, (CH$_2$)$_n$—COO—($C_1$-$C_2$)-alkyl, (CH$_2$)$_n$—COO-phenyl, (CH$_2$)$_n$—COO-benzyl, (CH$_2$)$_n$—CN, (CH$_2$)$_n$—COO (CH$_2$)$_m$—CO—($C_1$-$C_2$)-alkyl, (CH$_2$)$_n$—COO(CH$_2$)$_m$—CO-benzyl, (CH$_2$)$_n$—O—CO—($C_1$-$C_2$)-alkyl, (CH$_2$)$_n$—O—CO-phenyl, COO—(CH$_2$)$_n$-2-furfuryl, (CH$_2$)$_m$—O—(CH$_2$)$_n$-2-furfuryl or CHR$^9$—(CH$_2$)$_p$—COO—($C_1$-$C_2$)-alkyl, wherein R⁹ is $(C_1-C_4)$-alkyl, n is 1 or 2, m is 1 or 2 and p is 0 or 1, with the proviso that at least one of $R^3$ and $R^4$ is not hydrogen and $R^7$ is ethyl or methyl, forms a preferred embodiment of the present invention.

A dye mixture as described above, wherein the at least one dye of formula (1) is a dye of formula (1c)

(1c)

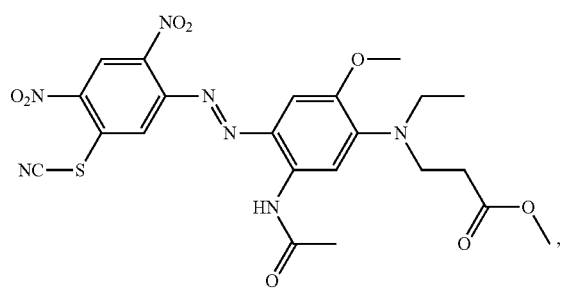

wherein independent from each other $R^3$ and $R^4$ is hydrogen, $(C_1-C_2)$-alkyl, $(CH_2)$-phenyl, $CH_2$—$CH=CH_2$, $(CH_2)_2$—O—$(C_1-C_2)$-alkyl, $(CH_2)_2$—O-phenyl, $(CH_2)_2$—O-benzyl, $(CH_2)_2$—O—$(CH_2)_m$—O—$(C_1-C_2)$-alkyl, $(CH_2)_n$—COO—$(C_1-C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1-C_2)$-alkyl, $(CH_2)_n$—COO$(CH_2)_m$—CO-benzyl, $(CH_2)_n$—O—CO—$(C_1-C_2)$-alkyl, $(CH_2)_n$—O—CO-phenyl, COO—$(CH_2)_n$-2-furfuryl, $(CH_2)_m$—O—$(CH_2)_n$-2-furfuryl or $CHR^9$—$(CH_2)_p$—COO—$(C_1-C_2)$-alkyl, wherein R⁹ is $(C_1-C_4)$-alkyl, n is 1 or 2, m is 1 or 2 and p is 0 or 1, with the proviso that at least one of $R^3$ and $R^4$ is not hydrogen, forms yet another preferred embodiment of the present invention.

Most preferred is a dye mixture as described above, wherein the at least one dye of formula (1) is selected from the group consisting of (1-1)

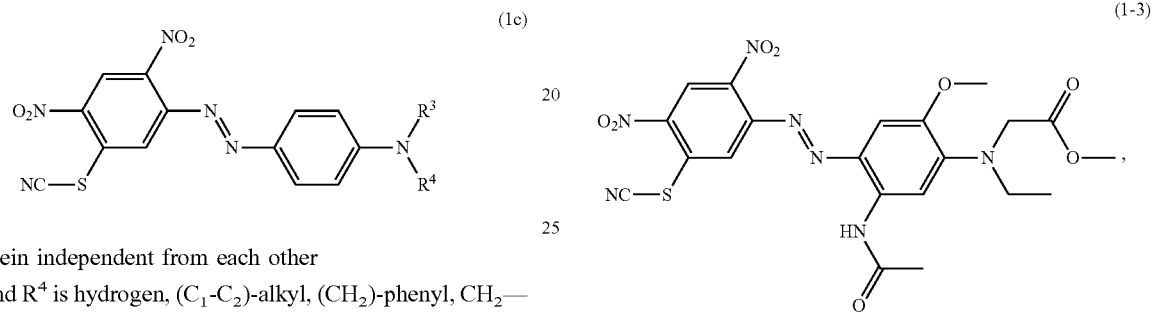

(1-2)

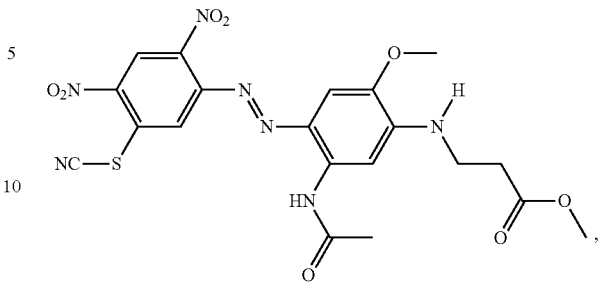

(1-3)

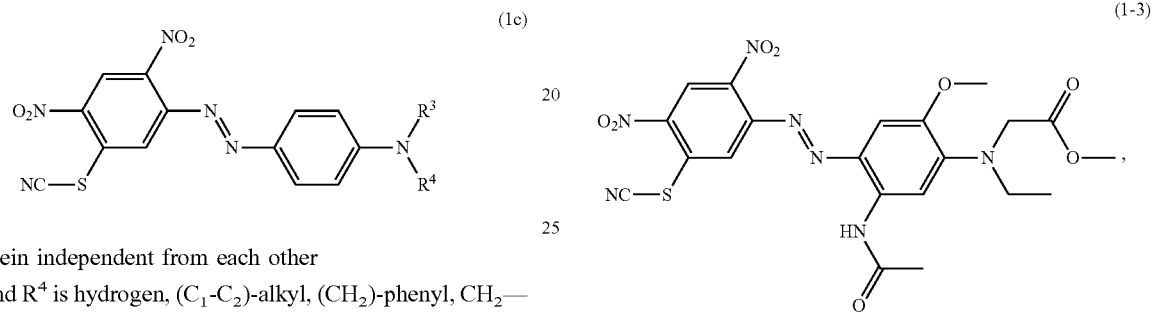

(1-4)

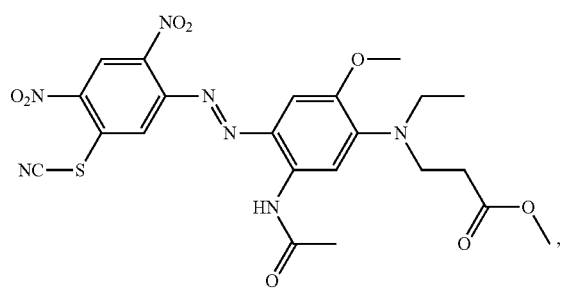

(1-5)

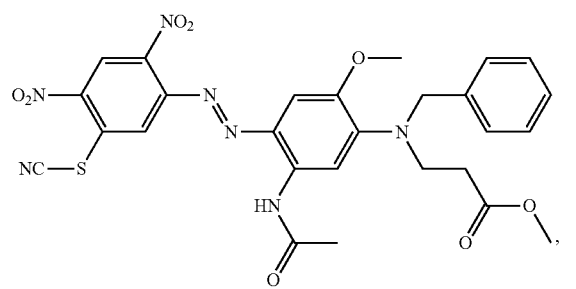

(1-6)

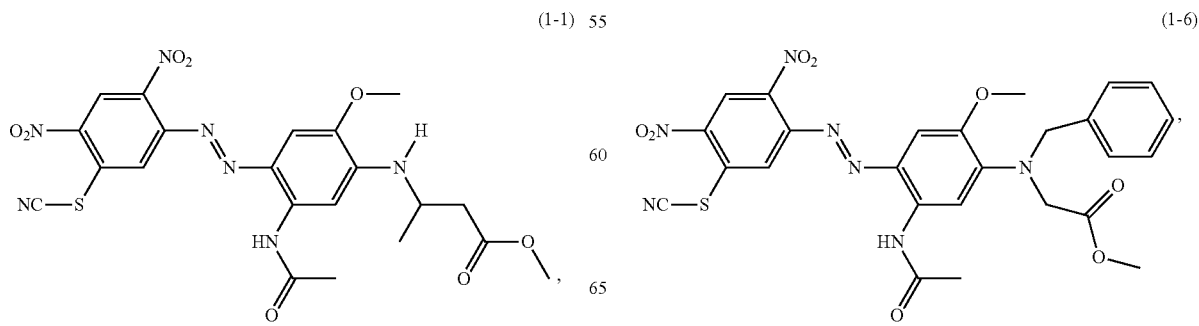

(1-7)
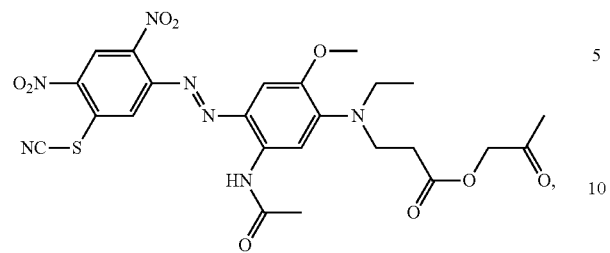
(1-8)
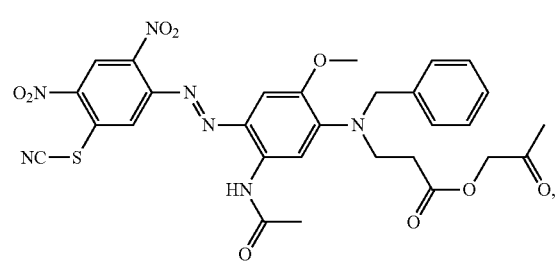
(1-9)
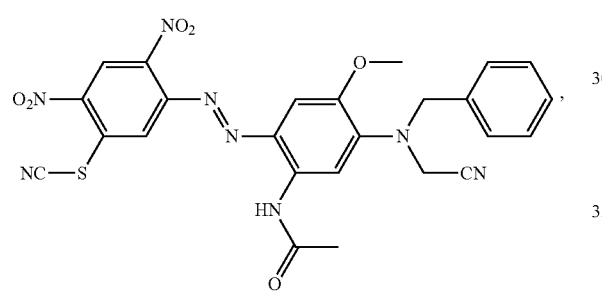
(1-10)
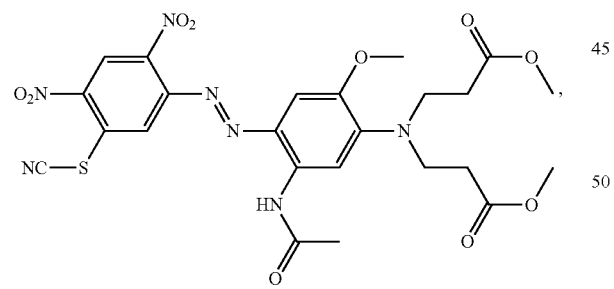
(1-11)
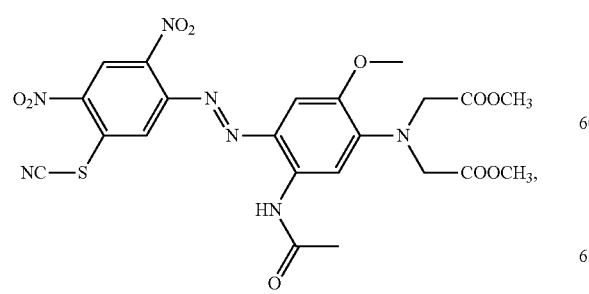
(1-12)
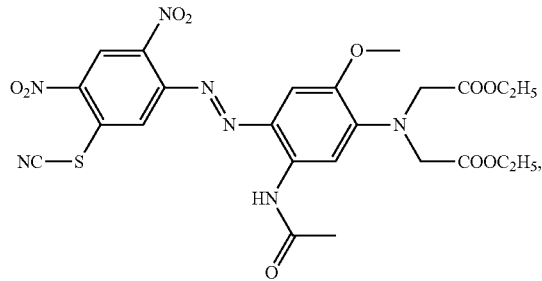
(1-13)
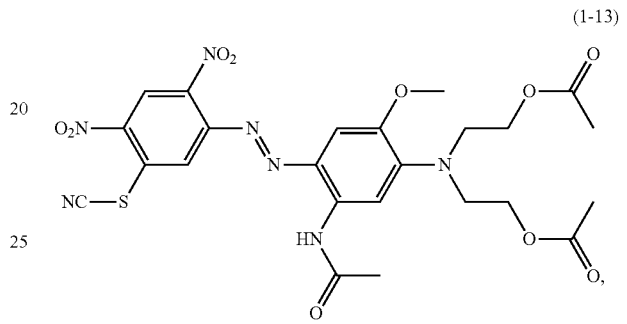
(1-14)
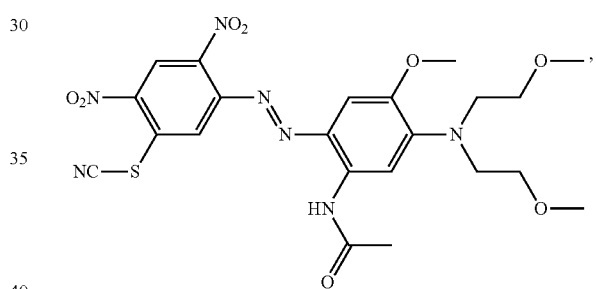
(1-15)
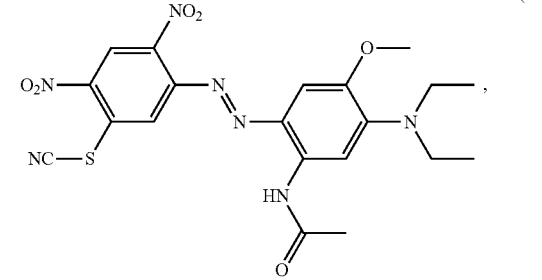
(1-16)
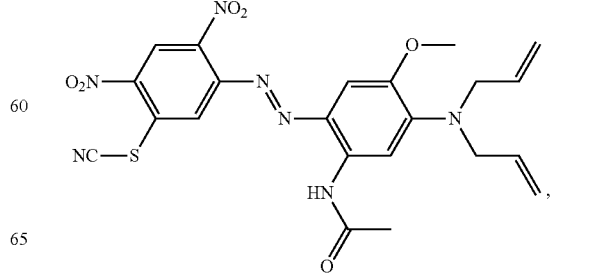

(1-17)
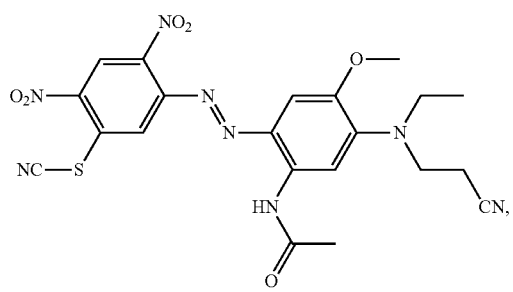
(1-18)
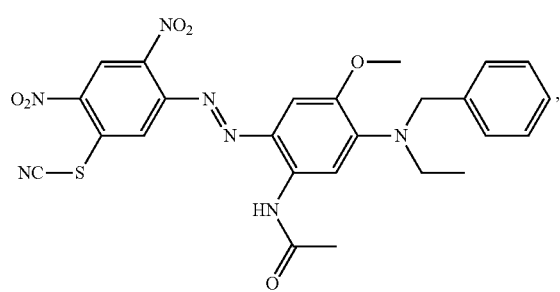
(1-19)
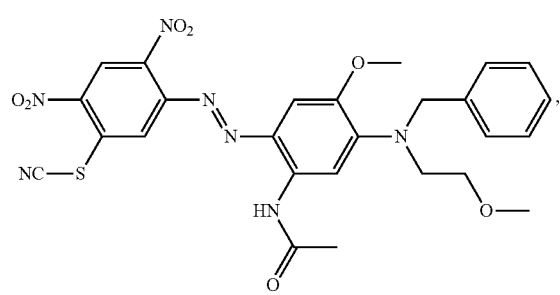
(1-20)
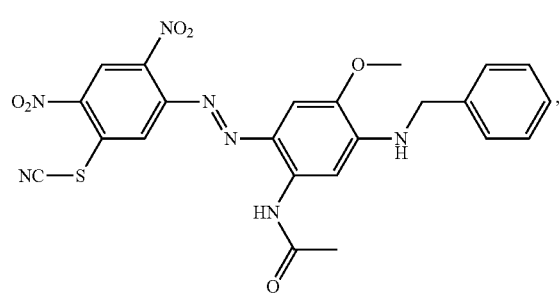
(1-21)
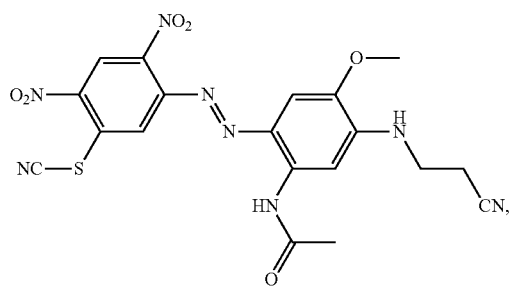
(1-22)
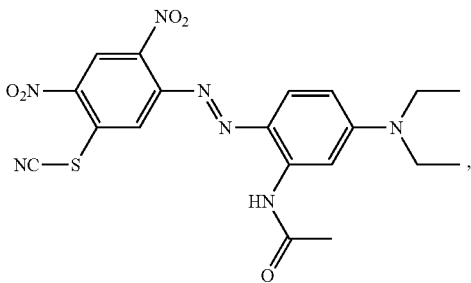
(1-23)
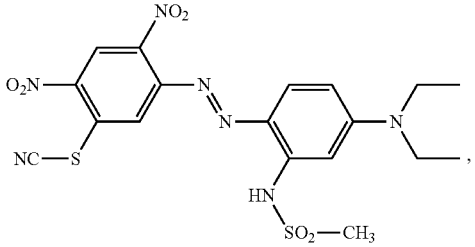
(1-24)
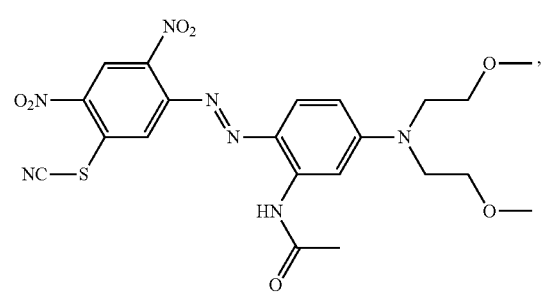
(1-25)
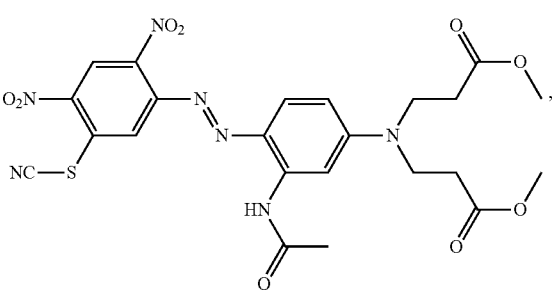
(1-26)
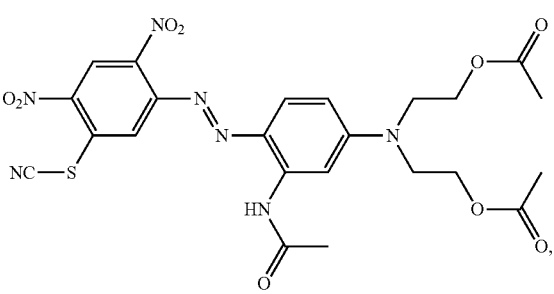

(1-27)
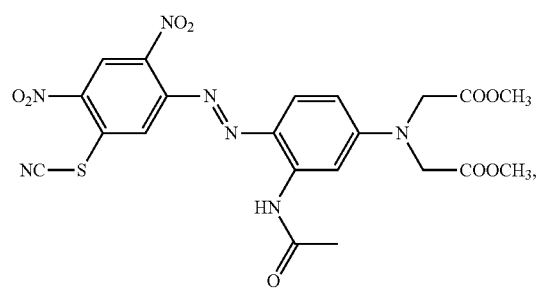
(1-28)
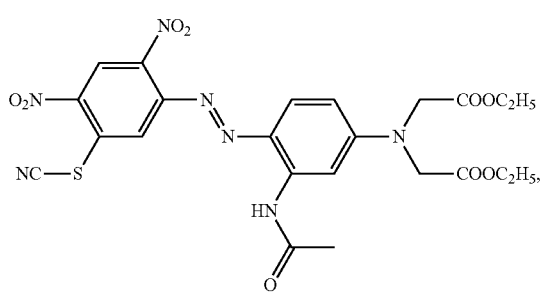
(1-29)
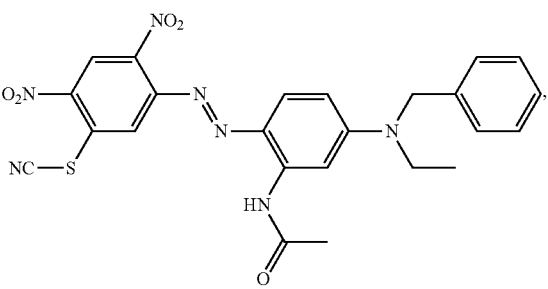
(1-30)
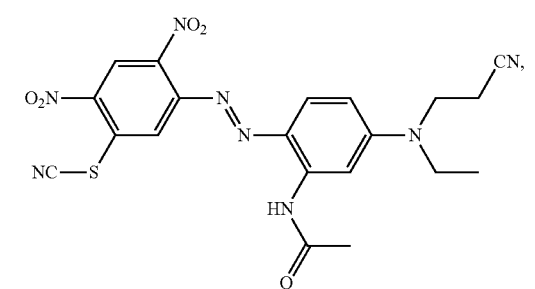
(1-31)
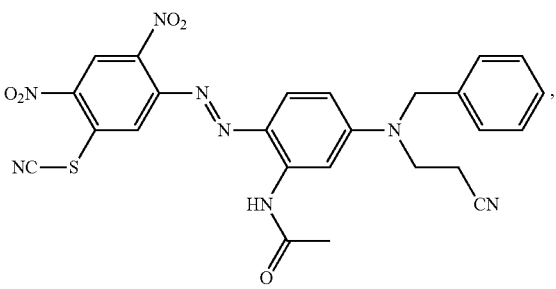
(1-32)
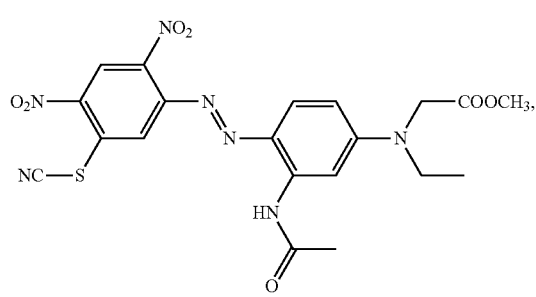
(1-33)
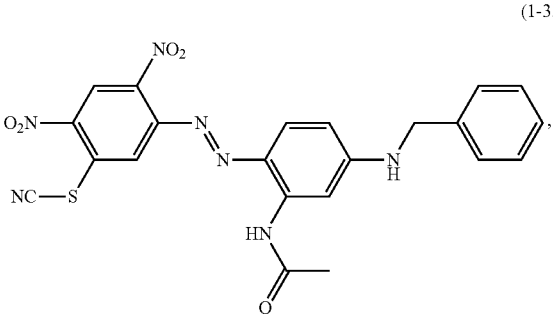
(1-34)
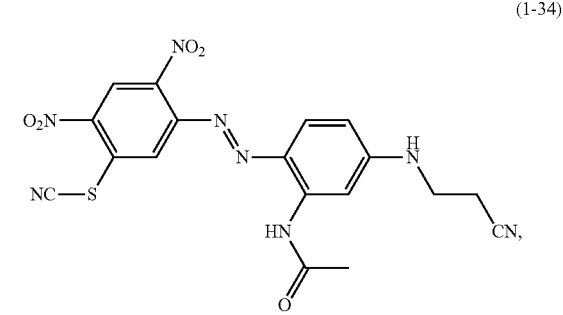
(1-35)
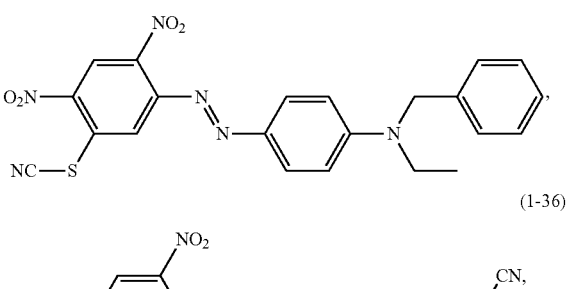
(1-36)
(1-37)
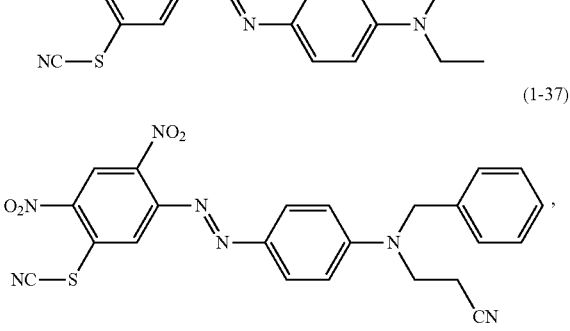

-continued

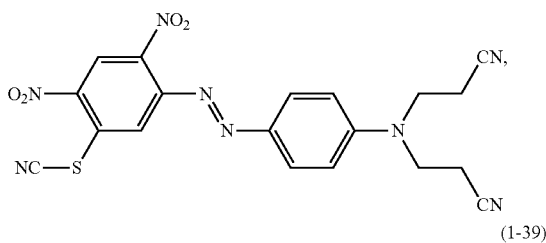
(1-38)

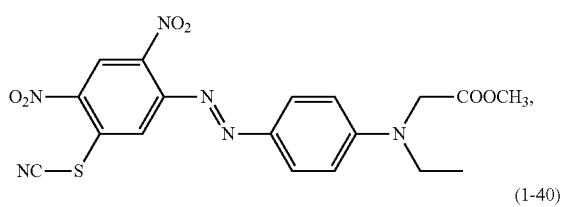
(1-39)

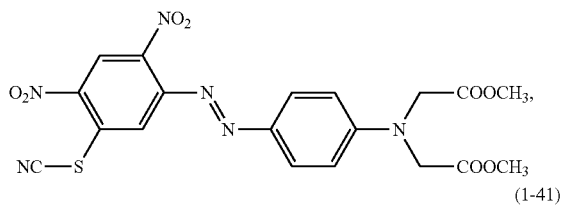
(1-40)

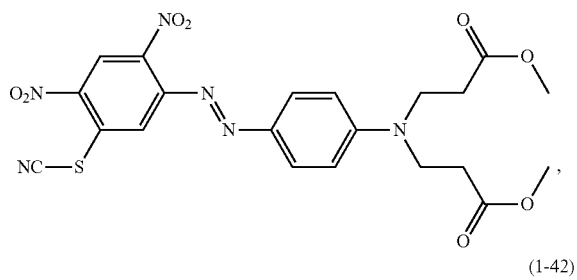
(1-41)

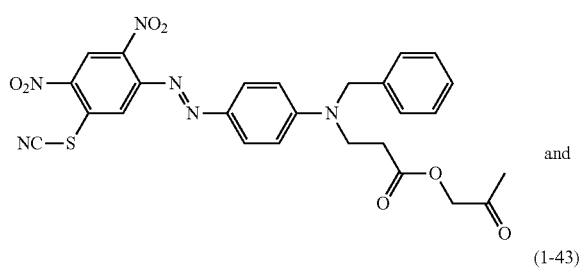
(1-42)

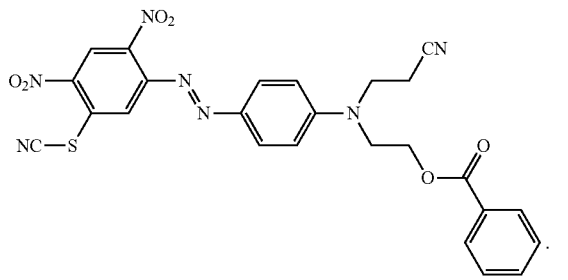
(1-43)

As to the selection of dyes of formula (2) a dye mixture as described above is preferred, wherein independent of each other in the at least one dye of formula (2)

$R^5$ and $R^6$ is hydrogen, $(C_1-C_2)$-alkyl, $(CH_2)$-phenyl, $CH_2$—$CH$=$CH_2$, $(CH_2)_2$—O—$(C_1-C_2)$-alkyl, $(CH_2)_2$—O-phenyl, $(CH_2)_2$—O-benzyl, $(CH_2)_2$—O—$(CH_2)_m$—O—$(C_1-C_2)$-alkyl, $(CH_2)_2$—O—$(CH_2)_m$—O-phenyl, $(CH_2)_2$—O—$(CH_2)_m$—O-benzyl, $(CH_2)_n$—COO—$(C_1-C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1-C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1-C_2)$-alkyl, $(CH_2)_n$—O—CO-phenyl, $(CH_2)_n$—O—CO-benzyl, COO—$(CH_2)_n$-2-furfuryl or $(CH_2)_m$—O—$(CH_2)_n$-2-furfuryl, wherein
n is 1 or 2 and
m is 1 or 2,
with the proviso that at least one of $R^5$ and $R^6$ is not hydrogen,
$R^{10}$ is hydrogen, methyl or methoxy,
$R^{11}$ is hydrogen, hydroxy, COOH, COO—$(C_1-C_2)$-alkyl, $(C_1-C_2)$-alkyl, —NHCO—$(C_1-C_2)$-alkyl, —NHCO-aryl, —NHCO-benzyl or —NHSO_2—$(C_1-C_2)$-alkyl,
$X^5$ and $X^6$ is hydrogen, chloro, bromo, nitro or cyano,
with the proviso that at least one of $X^5$ and $X^6$ is not hydrogen
and
L is hydrogen or
in case $X^6$ is nitro and $X^5$ is hydrogen L is hydrogen or fluoro.

More preferred is a dye mixture as described above, wherein independent of each other in the at least one dye of formula (2)

$R^5$ and $R^6$ is hydrogen, $(C_1-C_2)$-alkyl, $(CH_2)$-phenyl, $CH_2$—$CH$=$CH_2$, $(CH_2)_2$—O—$(C_1-C_2)$-alkyl, $(CH_2)_2$—O-phenyl, $(CH_2)_2$—O-benzyl, $(CH_2)_2$—O—$(CH_2)_m$—O—$(C_1-C_2)$-alkyl, $(CH_2)_n$—COO—$(C_1-C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1-C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1-C_2)$-alkyl, $(CH_2)_n$—O—CO-phenyl, COO—$(CH_2)_n$-2-furfuryl or $(CH_2)_m$—O—$(CH_2)_n$-2-furfuryl, wherein
n is 1 or 2 and
m is 1 or 2,
with the proviso that at least one of $R^5$ and $R^6$ is not hydrogen,
$R^{10}$ is hydrogen or methoxy,
$R^{11}$ is hydrogen, methyl or —NHCO—$(C_1-C_2)$-alkyl,
$X^5$ and $X^6$ is hydrogen, bromo, chloro, nitro or cyano,
with the proviso that at least one of $X^5$ and $X^6$ is not hydrogen
and
L is hydrogen or
in case $X^6$ is nitro and $X^5$ is hydrogen L is hydrogen or fluoro.

A dye mixture as described above, wherein the at least one dye of formula (2) is a dye of formula (2a)

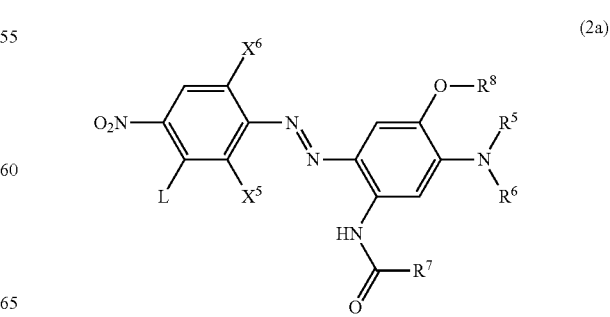
(2a)

wherein independent from each other $R^5$ and $R^6$ is hydrogen, $(C_1-C_2)$-alkyl, $(CH_2)$-phenyl, $CH_2$—$CH$=$CH_2$, $(CH_2)_2$—O—$(C_1-C_2)$-alkyl, $(CH_2)_2$—O-phenyl, $(CH_2)_2$—O-benzyl, $(CH_2)_2$—O—$(CH_2)_m$—O—$(C_1-C_2)$-alkyl, $(CH_2)_n$—COO—$(C_1-C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1-C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1-C_2)$-alkyl, $(CH_2)_n$—O—CO-phenyl, COO—$(CH_2)_n$-2-furfuryl or $(CH_2)_m$—O—$(CH_2)_n$-2-furfuryl,
  wherein
  n is 1 or 2 and
  m is 1 or 2,
  with the proviso that at least one of $R^5$ and $R^6$ is not hydrogen,
$R^7$ and $R^8$ is ethyl or methyl,
$X^5$ is hydrogen, bromo, chloro, nitro or cyano,
$X^6$ is hydrogen, nitro or cyano,
with the proviso that $X^5$ and $X^6$ are not both nitro
and
L is hydrogen or
in case $X^6$ is nitro and $X^5$ is hydrogen L is hydrogen or fluoro,
forms a preferred embodiment of the present invention.

A dye mixture as described above, wherein the at least one dye of formula (2) is a dye of (2) is a dye of formula (2b)

(2b)

$R^5$ and $R^6$ are hydrogen, $(C_1-C_2)$-alkyl, $(CH_2)$-phenyl, $CH_2$—$CH$=$CH_2$, $(CH_2)_2$—O—$(C_1-C_2)$-alkyl, $(CH_2)_2$—O-phenyl, $(CH_2)_2$—O-benzyl, $(CH_2)_2$—O—$(CH_2)_m$—O—$(C_1-C_2)$-alkyl, $(CH_2)_n$—COO—$(C_1-C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1-C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1-C_2)$-alkyl, $(CH_2)_n$—O—CO-phenyl, COO—$(CH_2)_n$-2-furfuryl or $(CH_2)_m$—O—$(CH_2)_n$-2-furfuryl,
  wherein
  n is 1 or 2 and
  m is 1 or 2,
  with the proviso that at least one of $R^5$ and $R^6$ is not hydrogen,
$R^7$ is ethyl or methyl and
$X^5$ is hydrogen, bromo, chloro, nitro or cyano,
$X^6$ is hydrogen, nitro or cyano,
with the proviso that $X^5$ and $X^6$ are not both nitro
and
L is hydrogen or
in case $X^6$ is nitro and $X^5$ is hydrogen L is hydrogen or fluoro
forms another preferred embodiment of the present invention.

A dye mixture as described above, wherein the at least one dye of formula (2) is a dye of formula (2c)

(2c)

wherein independent from each other
$R^2$ is hydrogen or —NHCO—$(C_1-C_2)$-alkyl,
$R^5$ and $R^6$ is hydrogen, $(C_1-C_2)$-alkyl, $(CH_2)$-phenyl, $CH_2$—$CH$=$CH_2$, $(CH_2)_2$—O—$(C_1-C_2)$-alkyl, $(CH_2)_2$—O-phenyl, $(CH_2)_2$—O-benzyl, $(CH_2)_2$—O—$(CH_2)_m$—O—$(C_1-C_2)$-alkyl, $(CH_2)_n$—COO—$(C_1-C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1-C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1-C_2)$-alkyl, $(CH_2)_n$—O—CO-phenyl, COO—$(CH_2)_n$-2-furfuryl or $(CH_2)_m$—O—$(CH_2)_n$-2-furfuryl,
  wherein
  n is 1 or 2 and
  m is 1 or 2
  with the proviso that at least one of $R^5$ and $R^6$ is not hydrogen,
$X^5$ and $X^6$ is bromo or chloro,
forms yet another preferred embodiment of the present invention.

A dye mixture as described above, wherein the at least one dye of formula (2) is a dye of formula (2d)

(2d)

wherein independent from each other
$R^5$ and $R^6$ is hydrogen, $(C_1-C_2)$-alkyl, $(CH_2)$-phenyl, $CH_2$—$CH$=$CH_2$, $(CH_2)_2$—O—$(C_1-C_2)$-alkyl, $(CH_2)_2$—O-phenyl, $(CH_2)_2$—O-benzyl, $(CH_2)_2$—O—$(CH_2)_m$—O—$(C_1-C_2)$-alkyl, $(CH_2)_n$—COO—$(C_1-C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1-C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1-C_2)$-alkyl, $(CH_2)_n$—O—CO-phenyl, COO—$(CH_2)_n$-2-furfuryl or $(CH_2)_m$—O—$(CH_2)_n$-2-furfuryl,
  wherein
  n is 1 or 2 and
  m is 1 or 2
  with the proviso that at least one of $R^5$ and $R^6$ is not hydrogen,
$R^7$ is ethyl or methyl
$R^{10}$ is hydrogen, methyl or methoxy, $X^6$ is chloro, bromo, nitro or cyano,
and
L is hydrogen or
in case $X^6$ is nitro L is hydrogen or fluoro,
forms still another preferred embodiment of the present invention.
Most preferred is a dye mixture as described above, wherein the at least one dye of formula (2) is selected from the group consisting of
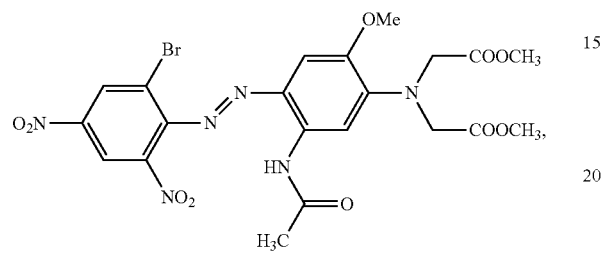
(2-1)
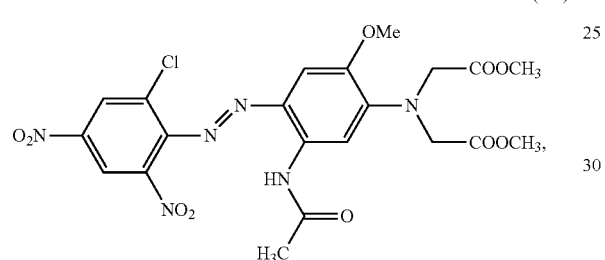
(2-2)
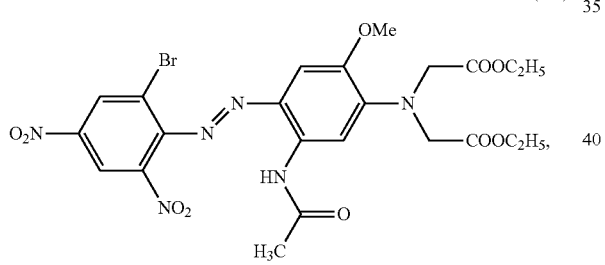
(2-3)
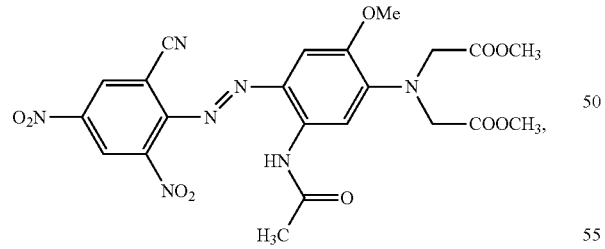
(2-4)
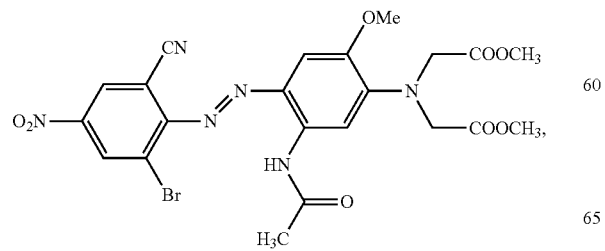
(2-5)
-continued
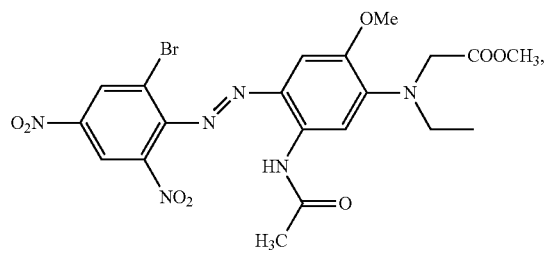
(2-6)
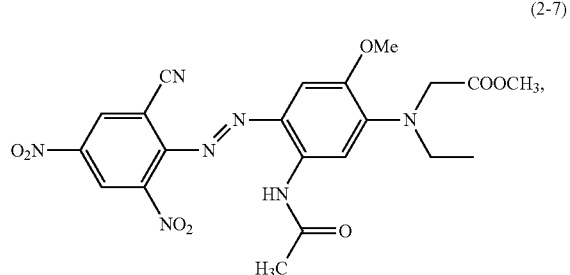
(2-7)
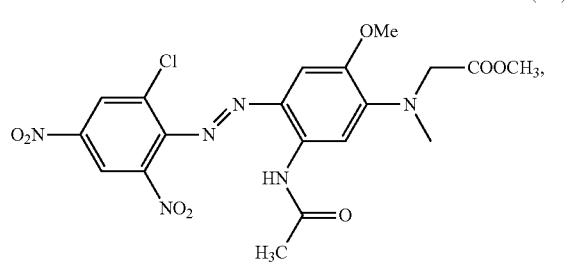
(2-8)
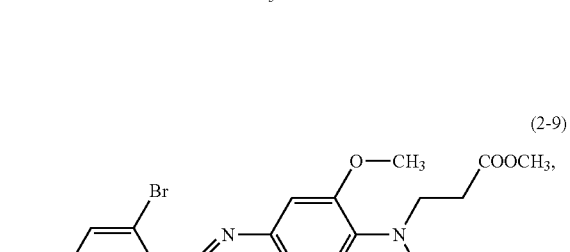
(2-9)
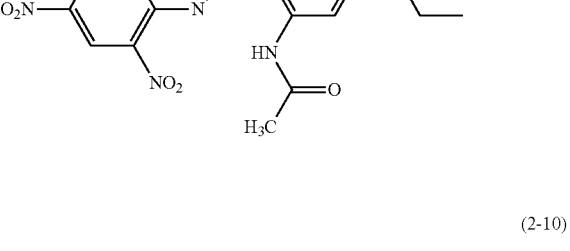
(2-10)
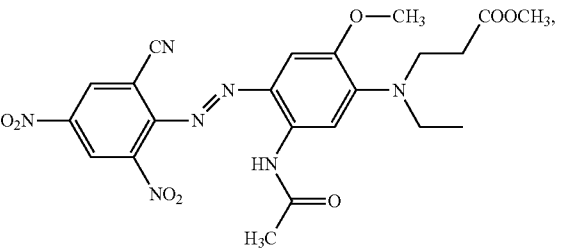

(2-11)
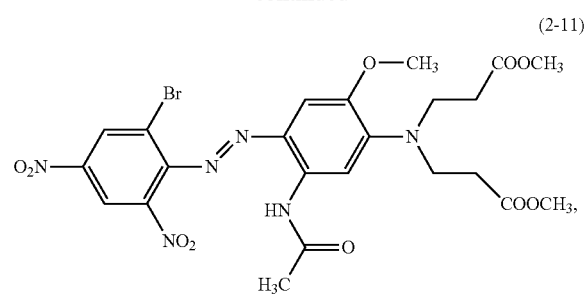
(2-12)
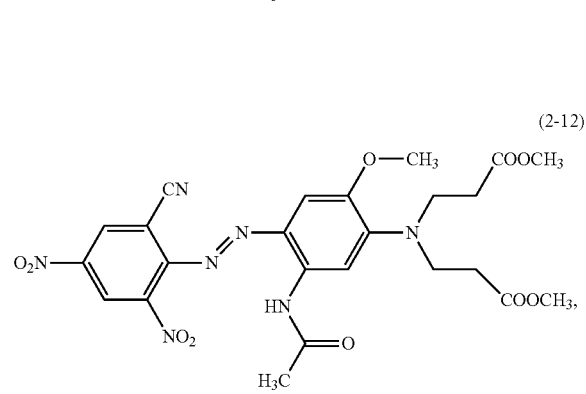
(2-13)
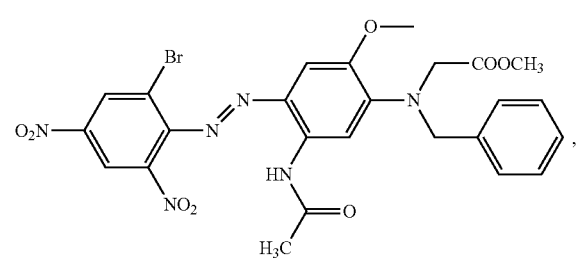
(2-14)
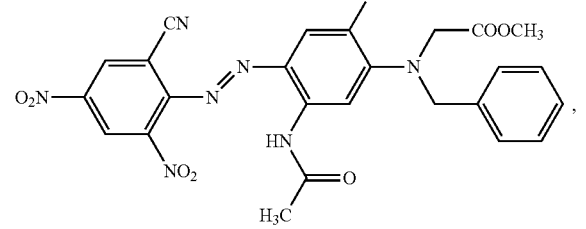
(2-15)
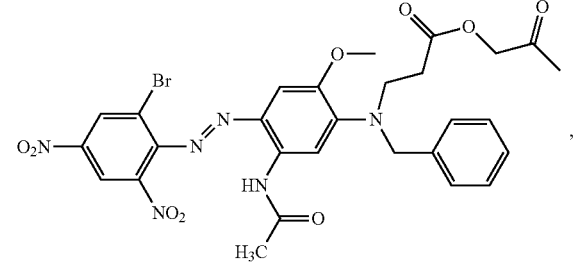
(2-16)
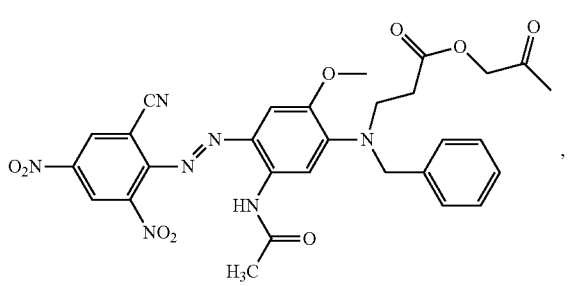
(2-17)
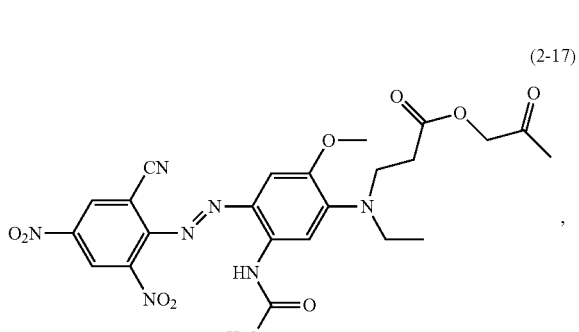
(2-18)
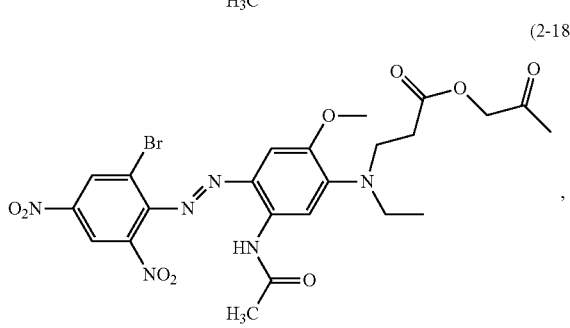
(2-19)
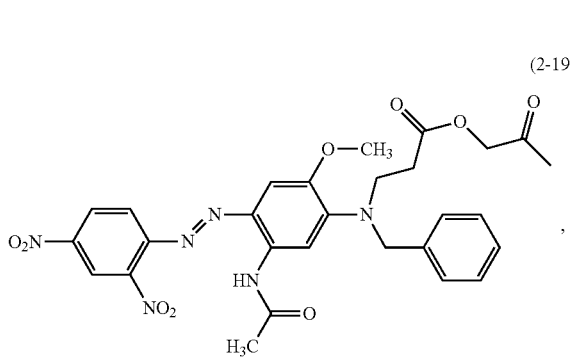
(2-20)
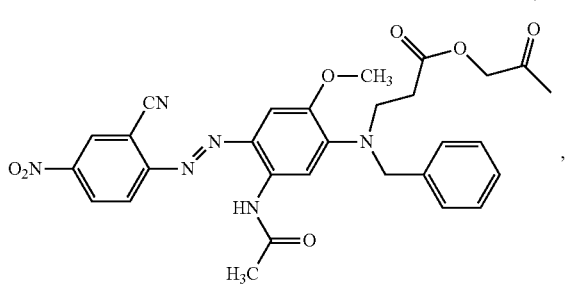

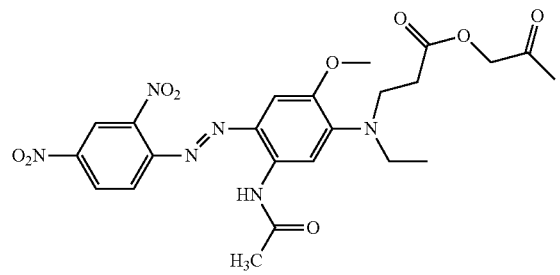
(2-21)
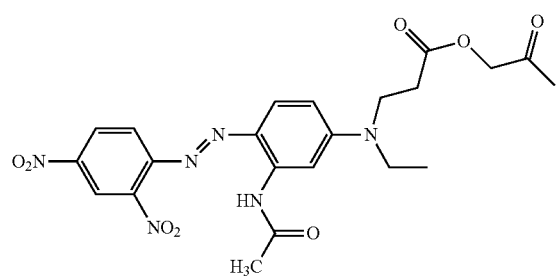
(2-22)
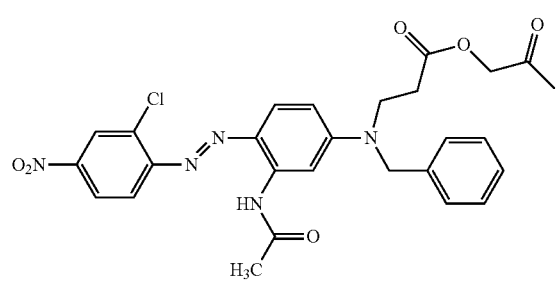
(2-23)
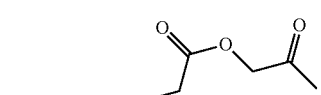
(2-24)
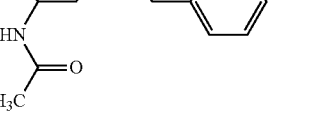
(2-25)
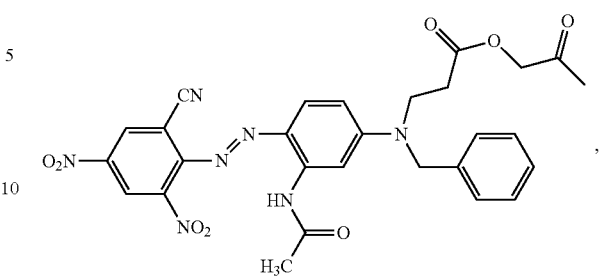
(2-26)
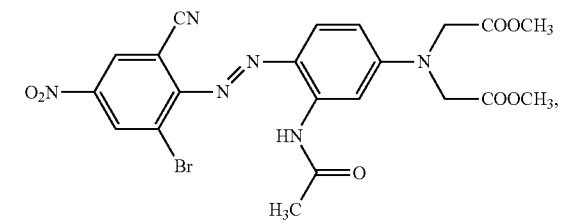
(2-27)
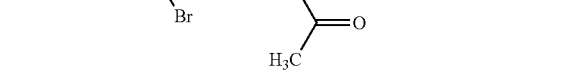
(2-28)
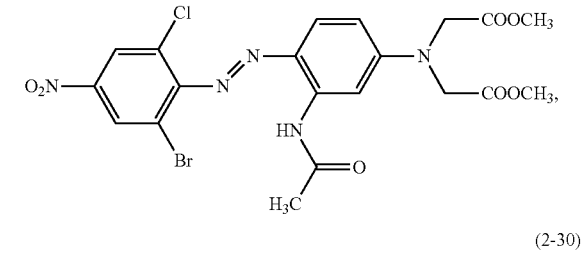
(2-29)
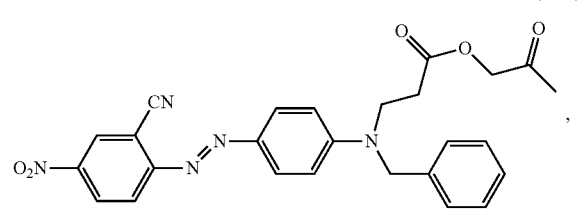
(2-30)
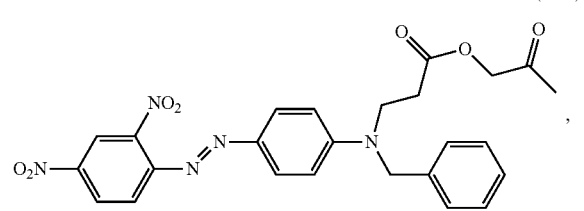
(2-31)

-continued
(2-32)
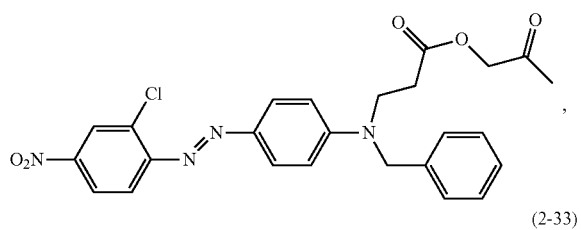
(2-33)
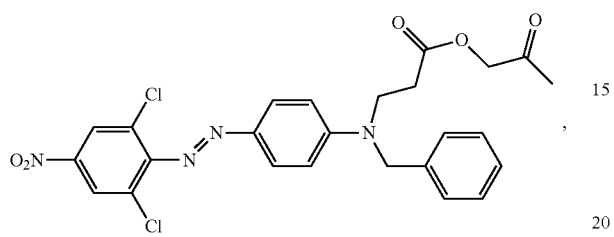
(2-34)
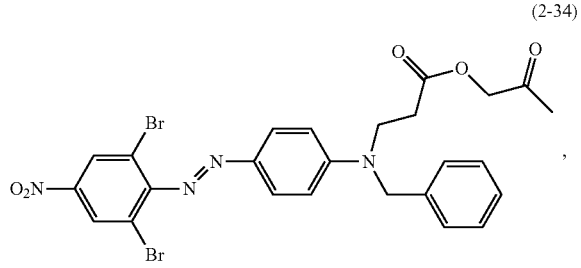
(2-35)
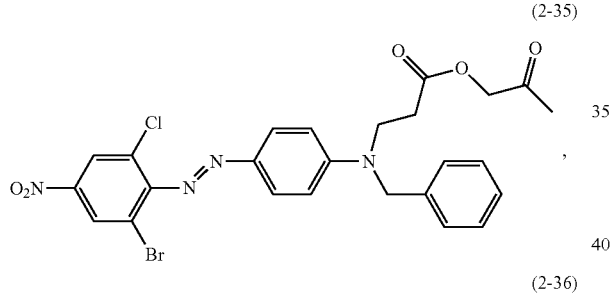
(2-36)
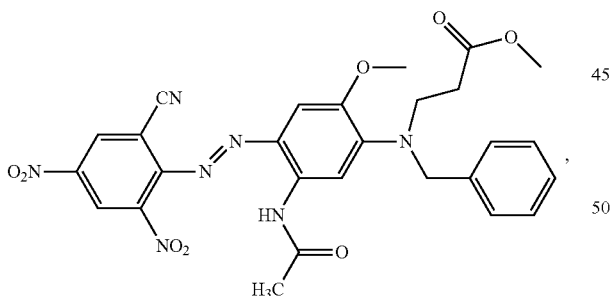
(2-37)
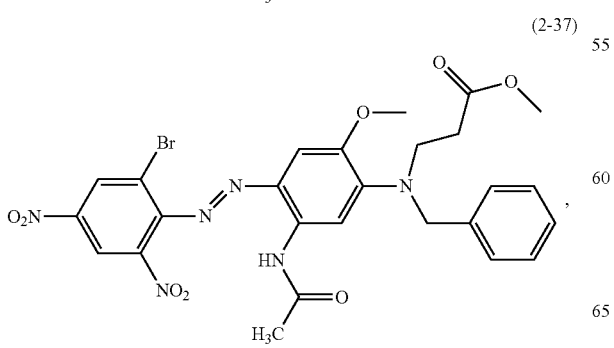
-continued
(2-38)
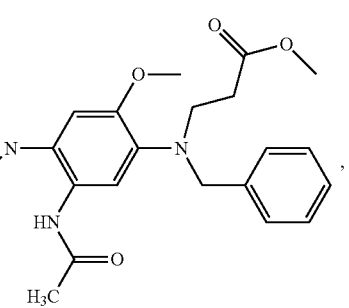
(2-39)
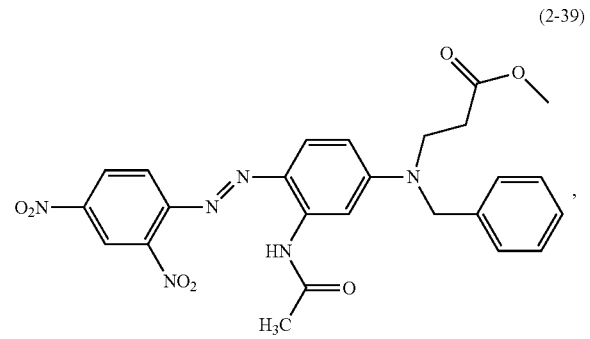
(2-40)
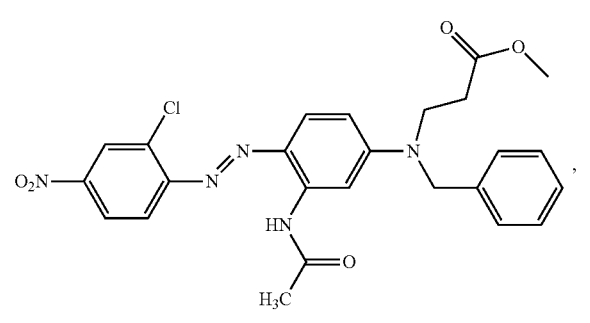
(2-41)
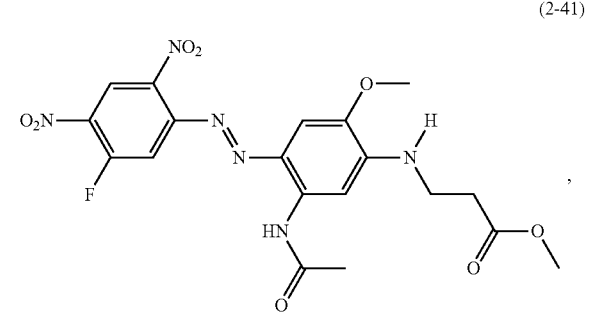
(2-42)
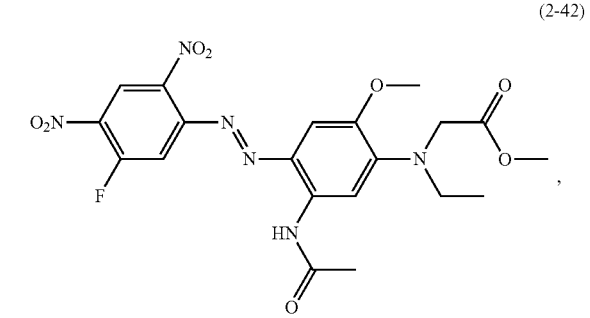

(2-43), (2-44), (2-45), (2-46), (2-47), (2-48), (2-49), (2-50), (2-51), (2-52), (2-53) and -continued (2-54)

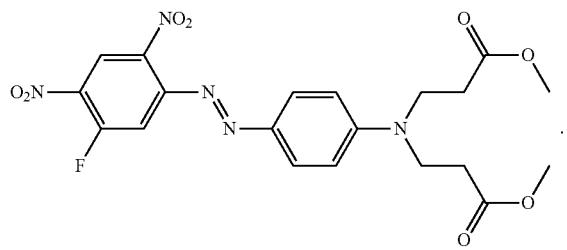

Also, regarding the number of different dyes selected from the ones shown above there exist preferred dye mixtures:

Preferred are dye mixtures comprising one dye of formula (1) and one dye of formula (2).

Preferred are dye mixtures comprising two dyes of formula (1) and one dye of formula (2).

Preferred are dye mixtures comprising one dye of formula (1) and two dyes of formula (2).

And preferred are dye mixtures comprising two dyes of formula (1) and two dyes of formula (2)

Those dye mixtures as described above are particularly preferred, wherein preferred dyes of formula (1) and preferred dyes of formula (2) are combined, such as a dye mixture, wherein independent from each other $R^1$ is hydrogen, methyl or methoxy, $R^2$ is hydrogen, hydroxy, COOH, COO—$(C_1$-$C_2)$-alkyl, $(C_1$-$C_2)$-alkyl, —NHCO—$(C_1$-$C_2)$-alkyl, —NHCO-aryl, —NHCO-benzyl or —NHSO$_2$—$(C_1$-$C_2)$-alkyl, $R^3$ to $R^6$ is hydrogen, $(C_1$-$C_2)$-alkyl, $(CH_2)$-phenyl, $CH_2$—CH=$CH_2$, $(CH_2)_2$—O—$(C_1$-$C_2)$-alkyl, $(CH_2)_2$—O-phenyl, $(CH_2)_2$—O-benzyl, $(CH_2)_2$—O—$(CH_2)_m$—O—$(C_1$-$C_2)$-alkyl, $(CH_2)_2$—O—$(CH_2)_m$—O-phenyl, $(CH_2)_2$—O—$(CH_2)_m$—O-benzyl, $(CH_2)_n$—COO—$(C_1$-$C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1$-$C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1$-$C_2)$-alkyl, $(CH_2)_n$—O—CO-phenyl, $(CH_2)_n$—O—CO-benzyl, COO—$(CH_2)_n$-2-furfuryl or $(CH_2)_m$—O—$(CH_2)_n$-2-furfuryl, wherein n is 1 or 2 and m is 1 or 2, with the proviso that $R^3$ and $R^4$ in formula (1) are not $(CH_2)_n$—COO$(CH_2)_m$—CO-phenyl and that at least one of $R^3$ and $R^4$ in formula (1) and at least one of $R^5$ and $R^6$ in formula (2) is not hydrogen, $R^{10}$ is hydrogen, methyl or methoxy, $R^{11}$ is hydrogen, hydroxy, COOH, COO—$(C_1$-$C_2)$-alkyl, $(C_1$-$C_2)$-alkyl, —NHCO—$(C_1$-$C_2)$-alkyl, —NHCO-aryl, —NHCO-benzyl or —NHSO$_2$—$(C_1$-$C_2)$-alkyl, $X^5$ and $X^6$ is hydrogen, chloro, bromo, nitro or cyano, with the proviso that at least one of $X^5$ and $X^6$ in formula (2) is not hydrogen and L is hydrogen or in case $X^6$ is nitro and $X^5$ is hydrogen L is hydrogen or fluoro.

Accordingly, even more preferred is a dye mixture as described above, wherein independent from each other $R^1$ is hydrogen or methoxy, $R^2$ is hydrogen, methyl or —NHCO—$(C_1$-$C_2)$-alkyl, $R^3$ to $R^6$ is hydrogen, $C_1$-$C_2$-alkyl, $(CH_2)$-phenyl, $CH_2$—CH=$CH_2$, $(CH_2)_2$—O—$(C_1$-$C_2)$-alkyl, $(CH_2)_2$—O-phenyl, $(CH_2)_2$—O-benzyl, $(CH_2)_2$—O—$(CH_2)_m$—O—$(C_1$-$C_2)$-alkyl, $(CH_2)_n$—COO—$(C_1$-$C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1$-$C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1$-$C_2)$-alkyl, $(CH_2)_n$—O—CO-phenyl, COO—$(CH_2)_n$-2-furfuryl or $(CH_2)_m$—O—$(CH_2)_n$-2-furfuryl, wherein n is 1 or 2 and m is 1 or 2, with the proviso that $R^3$ and $R^4$ in formula (1) are not $(CH_2)_n$—COO$(CH_2)_m$—CO-phenyl and that at least one of $R^3$ and $R^4$ in formula (1) and at least one of $R^5$ and $R^6$ in formula (2) is not hydrogen, $R^{10}$ is hydrogen or methoxy, $R^{11}$ is hydrogen, methyl or —NHCO—$(C_1$-$C_2)$-alkyl, $X^5$ and $X^6$ is hydrogen, bromo, chloro, nitro or cyano, with the proviso that at least one of $X^5$ and $X^6$ in formula (2) is not hydrogen and L is hydrogen or in case $X^6$ is nitro and $X^5$ is hydrogen L is hydrogen or fluoro.

Particularly preferred is a dye mixture as described above comprising at least one dye of formula (1a) and at least one dye of formula (2a).

Also, particularly preferred are dye mixtures comprising:

at least one dye of formula (1a) and at least one dye of formula (2b), at least one dye of formula (1a) and at least one dye of formula (2c), at least one dye of formula (1a) and at least one dye of formula (2d), at least one dye of formula (1b) and at least one dye of formula (2a), at least one dye of formula (1b) and at least one dye of formula (2b), at least one dye of formula (1b) and at least one dye of formula (2c), at least one dye of formula (1b) and at least one dye of formula (2d)

Most preferred is a dye mixture comprising at least one dye selected from the list consisting of dyes (1-1) to (1-43) as described above and at least one dye selected from the list consisting of dyes (2-1) to (2-54).

Also preferred is a dye mixture as described above, comprising one or more dyes selected from the group consisting of dyes of formulae (3), (4) and (5), (3)

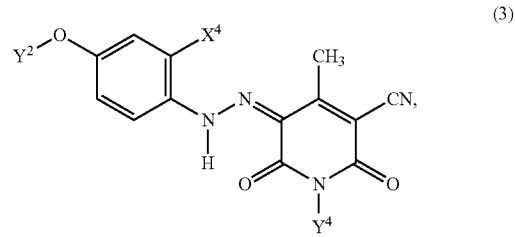

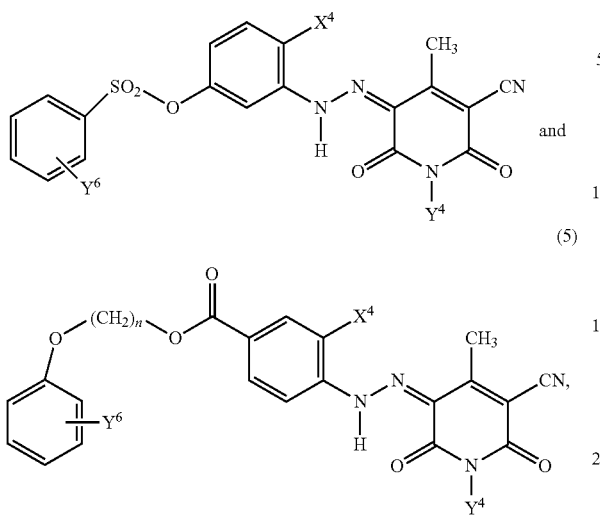

(4)

(5)

wherein independent from each other
X⁴ is hydrogen or nitro,
$Y^2$ is $(C_1\text{-}C_4)$-alkyl, phenyl or $(CH_2)_m$-phenyl,
$Y^4$ is $(C_1\text{-}C_8)$-alkyl or $(CH_2)_m$-phenyl,
$Y^6$ is hydrogen, nitro, cyano, carboxy, $(C_1\text{-}C_4)$-alkyl or $(C_1\text{-}C_4)$-alkoxy and
m is 1 to 4.

More preferred is a dye mixture as described above, comprising one or more dyes selected from the group consisting of dyes of formulae (3), (4) and (5) wherein
X⁴ is hydrogen or nitro,
$Y^2$ is $(C_1\text{-}C_2)$-alkyl or $(CH_2)_m$-phenyl,
$Y^4$ is $(C_1\text{-}C_4)$-alkyl or $(CH_2)$phenyl,
$Y^6$ is hydrogen, nitro, cyano or carboxy and
m is 1 or 2.

Even more preferred is a dye mixture as described above, comprising one or more dyes selected from the group consisting of dyes of formulae (3), (4) and (5) wherein
X⁴ is hydrogen or nitro,
$Y^2$ is $(C_1\text{-}C_2)$-alkyl or $(CH_2)_m$-phenyl,
$Y^4$ is $(C_1\text{-}C_4)$-alkyl or $(CH_2)_m$-phenyl,
$Y^6$ is hydrogen and
m is 1 or 2.

A dye mixture as described above is particularly preferred when comprising at least one dye of formula (3) selected from the dyes consisting of

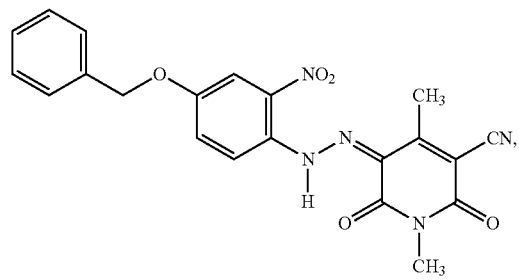

(3-1)

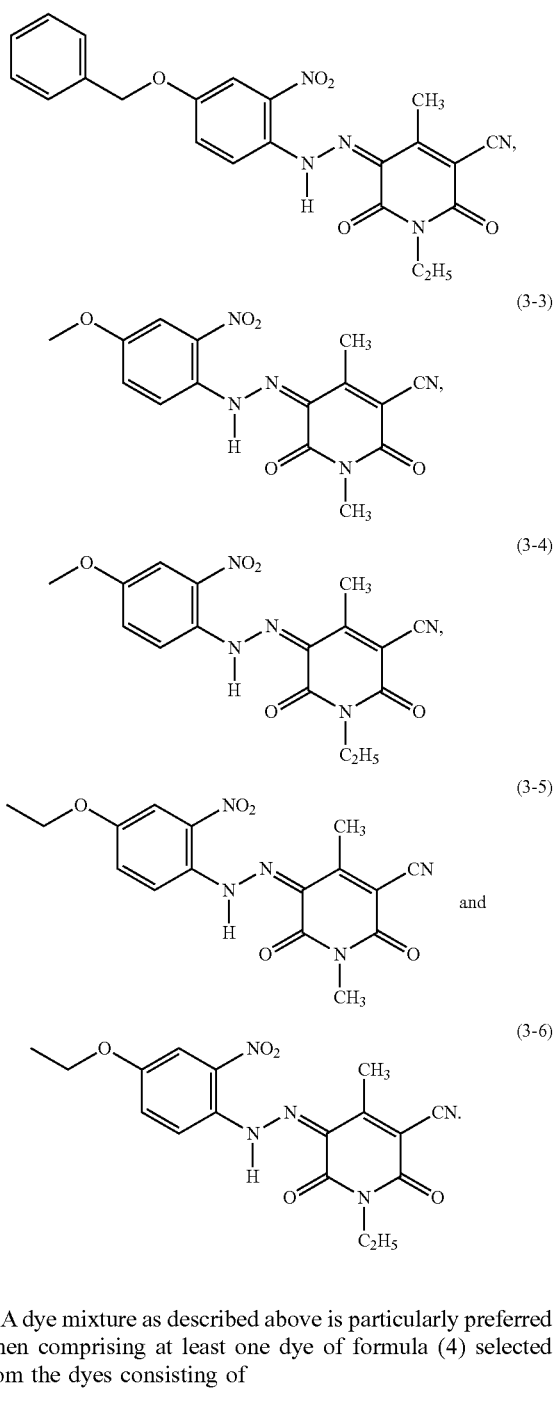

A dye mixture as described above is particularly preferred when comprising at least one dye of formula (4) selected from the dyes consisting of

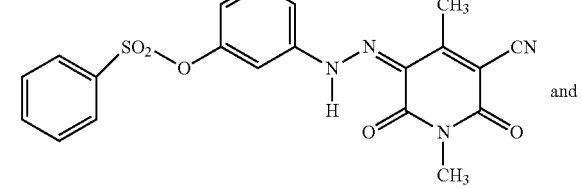

(4-1)

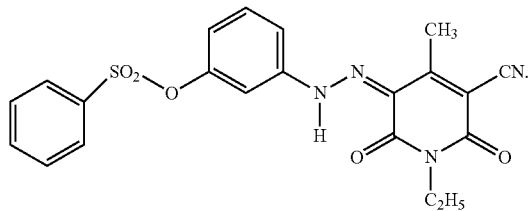

(4-2)

A dye mixture as described above is particularly preferred when comprising at least one dye of formula (5) selected from the dyes consisting of

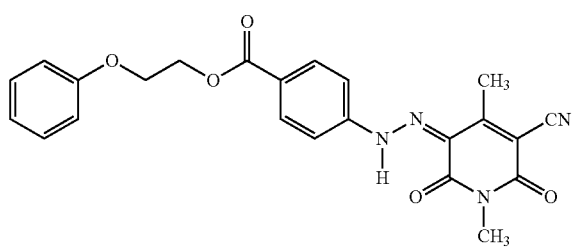

(5-1)

and

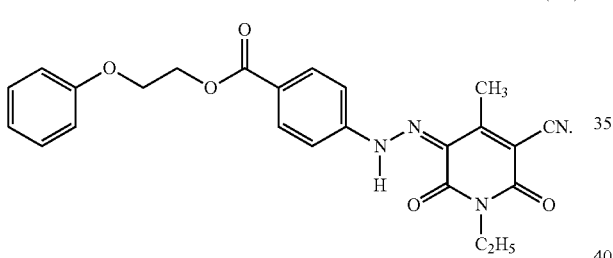

(5-2)

The dyes of formula (1) and (2) are known and can be prepared according to known procedures, for example from: U.S. Pat. No. 4,619,993, DD 209 641 and EP 0 864 615.

The dyes of formula (3), (4) and (5) are known and can be prepared according to known procedures, for example from the documents: EP 0 440 072, DE 19 646 429, GB 2 300 863, U.S. Pat. No. 4,140,684 and DE 1544446.

A process for the production of a dye mixture as described above, comprising a) mixing the dyes of formula (1) and (2) and optionally the dyes of formula (3) and/or (4) and/or (5),
b) homogenising the mixture obtained in step a)

forms another aspect of the present invention.

The also exist preferred ranges of the amount of dyes in the mixtures:

Ranges in weight % of the dye-components of the dye mixtures as described above are preferably:
Dye(s) of formula 1: 10 to 90,
Dye(s) of formula 2: 90 to 10.
More preferred are:
Dye(s) of formula 1: 25 to 75,
Dye(s) of formula 2: 75 to 25.

The amounts of dyes of formula (1) and of formula (2) add up to 100 wt % in those cases where no additional dyes are present in the dye mixtures. In those cases where other dyes—and preferably those selected from the dyes of formulae (3), (4) and (5)—are present, the amount of dyes preferably is as follows:
Dye(s) of formula 1: 10 to 80,
Dye(s) of formula 2: 80 to 10,
Other dyes: 10 to 35,
where again the sum of all dyes present adds up to 100 wt %.

And more preferred:
Dye(s) of formula 1: 25 to 60,
Dye(s) of formula 2: 60 to 25,
Dye(s) of formula 3, 4 and/or 5: 15 to 30,
where again the sum of all dyes present adds up to 100 wt %.

EXAMPLES

Example 1 a) 55 parts of a dye having formula (1-16) were mixed with 45 parts of a dye of the formula (2-2). The resulting dye mixture of the invention was mixed intensively with 100 parts of a lignin sulfonate dispersing agent (Reax 85A) and 300 parts of water. The pH of the mixture is adjusted with diluted Sulfuric acid to 5.5+/−0.2 and the milled in a glass bead mill (0.4 to 0.7 mm glass beads) for 4 to 6 hours to a size magnitude of 0.3 to 5 micrometres. The milled dye mixture slurry was filtrated from the glass beads and spray dried in a lab spray dryer (Buchi) at 120° C. inlet and 60 to 70° C. outlet temperature.

b) 1 g of the dye mixture obtained as per a) are dispersed in 100 ml of water at 40 to 50° C. A dyebath is prepared from 11.5 ml of this aqueous dispersion, 57.5 ml of deionized water and 1.2 ml of buffering solution (pH 4.5) and entered with a 5 g piece of polyester. The dyebath is heated to 130° C. and maintained at 130° C. for 45 minutes in a Werner Mathis high temperature dyeing machine. After rinsing with water and reduction clearing, the polyester material has a gives blue/navy dyeing with a good build up to deep shades, good light- and very good wet-fastness.

Example 2

30 parts dye of formula (1-15) were mixed with 30 parts of a dye of formula (1-16) and with 40 parts of a dye powder of the formula (2-28).

The resulting dye mixture of the invention was formulated using dispersing agent and dried via spray drying according to Example 1a) and gives blue/navy dyeing's on polyester or polyester blends under the dyeing conditions according to 1b) with a good light- and very good wet-fastness.

Example 3

46 parts dye of formula (1-11) were mixed with 28 parts of a dye of formula (2-1) and mixed with 26 parts of a dye powder of the formula (2-30)

The resulting dye mixture of the invention was formulated using dispersing agent and dried via spray drying according to Example 1a) and gives reddish navy dyeing's on polyester or polyester blends under the dyeing conditions according to 1b) with a good light- and very good wet-fastness.

Example 4

50 parts dye of formula (1-22) were mixed with 50 parts of a dye of formula (2-26).

The resulting dye mixture of the invention was formulated using dispersing agent and dried via spray drying according to Example 1a) and gives blue dyeing's on polyester or polyester blends under the dyeing conditions according to 1b) with good light- and very good wet-fastness.

All examples of the following tables are prepared as formulations as explained above.

| Example | Dye of formula (1) | Dye of formula (1) | Dye of formula (2) | Dye of formula (2) | Ratio (1):(1):(2):(2) | Shade on Polyester |
|---|---|---|---|---|---|---|
| 5  | (1-11) | —      | (2-27) | —      | 75:—:25:—       | Blue       |
| 6  | (1-11) | —      | (2-26) | (2-27) | 52:—:24:24      | Blue       |
| 7  | (1-22) | —      | (2-10) | —      | 25:—:75:—       | Blue       |
| 8  | (1-2)  | —      | (2-5)  | —      | 85:—:15:—       | Blue       |
| 9  | (1-5)  | —      | (2-1)  | —      | 50:—:50:—       | Blue       |
| 10 | (1-3)  | —      | (2-20) | —      | 57:—:43:—       | Red. Navy  |
| 11 | (1-4)  | —      | (2-50) | —      | 87:—:13:—       | Red. Navy  |
| 12 | (1-8)  | —      | (2-26) | —      | 60:—:40:—       | Blue       |
| 13 | (1-8)  | (1-11) | (2-30) | —      | 50:40:10:—      | Navy       |
| 14 | (1-11) | —      | (2-34) | —      | 67:—:33:—       | Black      |
| 15 | (1-22) | (1-11) | (2-35) | —      | 30:40:30:—      | Black      |
| 16 | (1-13) | —      | (2-44) | (2-33) | 40:—:31:29      | Black      |
| 17 | (1-11) | —      | (2-2)  | (2-29) | 35:—:31:34      | Black      |
| 18 | (1-9)  | (1-11) | (2-26) | (2-33) | 28:28:14:30     | Black      |
| 19 | (1-7)  | —      | (2-2)  | (2-30) | 36:—:45:19      | Red. Navy  |
| 20 | (1-11) | (1-22) | (2-1)  | (2-26) | 28:28:34:10     | Red. Navy  |
| 21 | (1-24) | —      | (2-43) | —      | 76:—:24:—       | Navy       |
| 22 | (1-22) | —      | (2-30) | —      | 66:—:34:—       | Violet     |
| 23 | (1-22) | (1-24) | (2-31) | —      | 43:40 :17:—     | Red. Navy  |
| 24 | (1-37) | —      | (2-30) | —      | 80:—:20:—       | Red        |
| 25 | (1-38) | —      | (2-50) | —      | 74:—:26:—       | Redviolet  |

| Example | Dye of formula (1) | Dye of formula (1) | Dye of formula (2) | Dye of formula (2) | Dye of formula (3) | Dye of formula (4) | Dye of formula (5) | Ratio (1):(1):(2):(2):(3):(4):(5) | Shade on Polyester |
|---|---|---|---|---|---|---|---|---|---|
| 26 | (1-11) | —      | (2-1)  | —      | (3-1) | —     | (5-1) | 37:—:30:—:22:—:11    | Black |
| 27 | (1-22) | —      | (2-27) | —      | (3-2) | (4-1) | —     | 60:—:20:—:12:8:—     | Black |
| 28 | (1-24) | —      | (2-1)  | (2-35) | —     | —     | (5-2) | 38:—:22:28:—:—:12    | Black |
| 29 | (1-9)  | (1-29) | (2-48) | (2-31) | (3-1) | (4-2) | (5-1) | 28:12:18:10:20:6:6   | Black |
| 30 | (1-4)  | (1-11) | (2-30) | —      | (3-2) | —     | (5-1) | 25:35:9:—:23:—:8     | Black |
| 31 | (1-22) | —      | (2-2)  | —      | (3-1) | —     | (5-1) | 46:—:28:—:17:—:9     | Black |
| 32 | (1-29) | —      | (2-2)  | —      | (3-3) | —     | —     | 25:—:58:—:17:—:—     | Black |
| 33 | (1-29) | (1-9)  | (2-44) | —      | (3-2) | (4-1) | —     | 32:15:16:—:28:9:—    | Black |
| 34 | (1-23) | —      | (2-35) | —      | —     | —     | (5-1) | 62:—:25:—:—:—:13     | Black |
| 35 | (1-22) | (1-24) | (2-30) | —      | (3-1) | —     | —     | 35:35:10:—:20:—:—    | Black |

When the dye mixture of the present invention is used in dyeing, the dye mixture is dispersed in an aqueous medium by means of a dispersing agent and wetting agent in the usual way to prepare a dye bath for dyeing or a printing of hydrophobic textile-fibres.

And also, the use of a dye mixture as described above for dying fibres, as well as blends of such fibres forms an aspect of the present invention.

The synthetic textile material may preferably be selected from aromatic polyester, especially polyethylene terephthalate, polyamide, especially polyhexamethylene adipamide, secondary cellulose acetate, cellulose triacetate, and natural textile materials, especially cellulosic materials and wool. An especially preferred textile material is an aromatic polyester or fibre blend thereof with fibres of any of the above-mentioned textile materials. Especially preferred fibre blends include those of polyester-cellulose, such as polyester-cotton, and polyester-wool.

The textile materials or blends thereof may be in the form of filaments, loose fibres, yarn or woven or knitted fabrics.

Particularly, among polyester fibres, not only ordinary polyester fibres (regular denier fibres) but also microfibres (fine denier fibres, which are less than 0.6 denier) may be used as fibres which can successfully be dyed with the dye mixture of the present invention.

In general all kinds of fibres can be dyed and therefore fibre and blends containing such fibre selected from the group consisting of: synthetic fibre materials, nylon materials, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres, and Lyocell fibres comprising a dye mixture as described above either in chemically and/or physically bound form forms/form another aspect of the present invention.

Typical examples of dispersing agent are lignosulphonates, naphthalene sulphonic acid/formaldehyde condensates and phenol/cresol/sulphanilic acid/formaldehyde condensates, typical examples of wetting agent are alkyl aryl ethoxylates which may be sulphonated or phosphated and typical example of other ingredients which may be present are inorganic salts, de-dusting agents such as mineral oil or nonanol, organic liquids and buffers. Dispersing agents may be present at from 30 to 500% based on the weight of the dye mixture. Dedusting agents may be used at from 0 to 5% based on the weight of the dye mixture.

A process for dyeing or printing carboxamido- and/or hydroxyl-containing material, comprising contacting the carboxamido- and/or hydroxyl-containing material with a dye mixture as described above and/or an aqueous solution as described above forms yet another aspect of the present invention.

For example, in the case of dyeing polyester fibres and fibre mixture products such as blended yarn fabrics of union cloth product comprising polyester fibres can be dyed with good colour fastness by common dyeing methods, such as a high temperature dyeing method, a carrier dyeing method and a thermosol dyeing method. In some cases, the addition of an acid substance to the dye bath may result in even more successful dyeing.

Suitable process conditions may be selected from the following
(i) exhaust dyeing at a pH of from 4 to 8.5, at a temperature of from 125 to 140° C. for from 10 to 120 minutes and under a pressure of from 1 to 2 bar, a sequestrant optionally being added;
(ii) continuous dyeing at a pH of from 4 to 8.5, at a temperature of from 190 to 225° C. for from 15 seconds to 5 minutes, a migration inhibitor optionally being added;
(iii) direct printing at a pH of from 4 to 6.5, at a temperature of from 160 to 185° C. for from 4 to 15 minutes for high temperature steaming, or at a temperature of from 190 to 225° C. for from 15 seconds to 5 minutes for bake fixation with dry heat or at a temperature of from 120 to 140° C. and 1 to 2 bar for from 10 to 45 minutes for pressure steaming, wetting agents and thickeners (such as alginates) of from 5 to 100% by weight of the dye optionally being added;
(iv) discharge printing (by padding the dye on to the textile material, drying and overprinting) at a pH of from 4 to 6.5, migration inhibitors and thickeners optionally being added;
(v) carrier dyeing at a pH of from 4 to 7.5, at a temperature of from 95 to 100° C. using a carrier such as methylnaphthalene, diphenylamine or 2-phenylphenol, sequestrants optionally being added; and
(vi) atmospheric dyeing of acetate, triacetate and nylon at a pH of from 4 to 7.5, at a temperature of about 85° C. for acetate or at a temperature of about 90° C. for triacetate and nylon for from 15 to 90 minutes, sequestrants optionally being added.

In all the above processes, the dye mixture is applied as a dispersion comprising from 0.001 to 20 wt. %, preferably from 0.005 to 16 wt. %, of the dye mixture in an aqueous medium.

In addition to the above-mentioned application processes, the dye mixture may be applied to synthetic textile materials and fibre blends by ink-jet printing, the substrates optionally having been pre-treated to aid printing.

An ink for digital textile printing, comprising a dye mixture as described above is another aspect of the present invention.

For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a $C_1$-$C_4$-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

The dyestuff may also be applied to textile materials using supercritical carbon dioxide, in which case the dye formulating agents may optionally be omitted.

The invention claimed is:

1. A dye mixture comprising
at least one dye of formula (1)

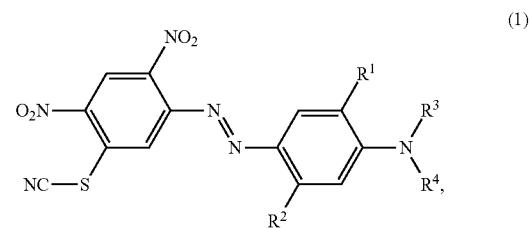

wherein independent of each other
$R^1$ is hydrogen, $(C_1$-$C_4)$-alkyl or $C_1$-$C_4$-alkoxy,
$R^2$ is hydrogen, carboxy, $(C_1$-$C_4)$-alkyl, halogen, acylamino, —NHCO-aryl, —NHCO-benzyl) or sulfonylamino,
$R^3$ and $R^4$ is hydrogen, $(C_1$-$C_4)$-alkyl, $(CH_2)_n$-phenyl, $CH_2$-$CH$=$CH_2$, $(CH_2)$n-OH, $(CH_2)_n$-O-$(C_1$-$C_4)$-alkyl, $(CH_2)_n$-O-phenyl, $(CH_2)_n$-O-benzyl, $(CH_2)_n$-O-$(CH_2)_m$-OH, $(CH_2)_n$-O-$(CH_2)_m$-O-$(C_1$-$C_4)$-alkyl, $(CH_2)_n$-O-$(CH_2)_m$-O-phenyl, $(CH_2)_n$-O-$(CH_2)_m$-O-benzyl,$(CH_2)_n$-COOH, $(CH_2)_n$-COO-$(C_1$-$C_4)$-alkyl, $(CH_2)_n$-COO-phenyl, $(CH_2)_n$-COO-benzyl,$(CH_2)_n$-CN, $(CH_2)_n$-COO$(CH_2)_m$-CO-$(C_1$-$C_4)$-alkyl, $(CH_2)_n$-COO$(CH_2)_m$-CO-benzyl,$(CH_2)_n$-O-CO-$(C_1$-$C_4)$-alkyl, $(CH_2)_n$-O-CO-phenyl, $(CH_2)_n$-O-CO-benzyl, COO-$(CH_2)_n$-2-furfuryl, $(CH_2)_m$-O-$(CH_2)_n$-2-furfuryl, $CHR^9$-$(CH_2)_p$-$(C_1$-$C_4)$-alkyl, $CHR^9$-$(CH_2)_p$-phenyl, $CHR^9$—$CH$=$CH_2$, $CHR^9$-$(CH_2)_p$-OH, $CHR^9$-$(CH_2)_p$-O-$(C_1$-$C_4)$-alkyl, $CHR^9$-$(CH_2)_p$-O-phenyl, $CHR^9$-$(CH_2)_p$-O-benzyl, $CHR^9$-$(CH_2)_p$-O-$(CH_2)_m$-OH, $CHR^9$-$(CH_2)_p$-O-$(CH_2)_m$-O-$(C_1$-$C_4)$-alkyl, $CHR^9$-$(CH_2)_p$-O-$(CH_2)_m$-O-phenyl, $CHR^9$-$(CH_2)_p$-O-$(CH_2)_m$-O-benzyl, $CHR^9$-$(CH_2)_p$-COOH, $CHR^9$-$(CH_2)_p$-COO-$(C_1$-$C_4)$-alkyl, $CHR^9$-$(CH_2)_p$-COO-phenyl, $CHR^9$-$(CH_2)_p$-COO-benzyl, $CHR^9$-$(CH_2)_p$-CN, $CHR^9$-$(CH_2)_p$-COO$(CH_2)_m$-CO-$(C_1$-$C_4)$-alkyl, $CHR^9$-$(CH_2)_p$-COO$(CH_2)_m$-CO-phenyl, $CHR^9$-$(CH_2)_p$-COO$(CH_2)_m$-CO-benzyl, $CHR^9$-$(CH_2)_p$-O-CO-$(C_1$-$C_4)$-alkyl, $CHR^9$-$(CH_2)_p$-O-CO-phenyl, $CHR^9$-$(CH_2)_p$-O-CO-benzyl, $CHR^9$-$(CH_2)_p$ -2-furfuryl or $CHR^9$-$(CH_2)_p$-$(CH_2)_n$-2-furfuryl,
wherein
$R^9$ is $(C_1$-$C_4)$-alkyl or $(C_1$-$C_4)$-alkyl substituted by —OH or halogen,
n is 1 to 4,
m is 1 to 4 and
p is 0 to 3,
with the proviso that at least one of $R^3$ and $R^4$ is not hydrogen,
and
at least one dye of formula (2)

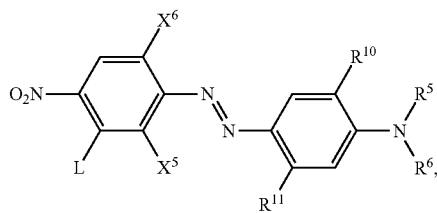

(2)

wherein independent of each other

R⁵ and R⁶ is hydrogen, $(C_1-C_4)$-alkyl, $(CH_2)_n$-phenyl, $CH_2-CH=CH_2$, $(CH_2)_n$-OH, $(CH_2)_n$-O-$(C_1-C_4)$-alkyl, $(CH_2)_n$-O-phenyl, $(CH_2)_n$-O-benzyl, $(CH_2)_n$-O-$(CH_2)_m$-OH, $(CH_2)_n$-O-$(CH_2)_m$-O-$(C_1-C_4)$-alkyl, $(CH_2)_n$-O-$(CH_2)_m$-O-phenyl, $(CH_2)_n$-O-$(CH_2)_m$-O-benzyl, $(CH_2)_n$-COOH, $(CH_2)_n$-COO-$(C_1-C_4)$-alkyl, $(CH_2)_n$-COO-phenyl, $(CH_2)_n$-COO-benzyl, $(CH_2)_n$-CN, $(CH_2)_n$-COO$(CH_2)_m$-CO-$(C_1-C_4)$-alkyl, $(CH_2)_n$-COO$(CH_2)_m$-CO-phenyl, $(CH_2)_n$-COO$(CH_2)_m$-CO-benzyl, $(CH_2)_n$-O-CO-$(C_1-C_4)$-alkyl, $(CH_2)_n$-O-CO-phenyl, $(CH_2)_n$-O-CO-benzyl, COO-$(CH_2)_n$-2-furfuryl or $(CH_2)_m$-O-$(CH_2)$n-2-furfuryl, wherein n is 1 to 4 and m is 1 to 4, with the proviso that at least one of R⁵ and R⁶ is not hydrogen, $R^{10}$ is hydrogen, $(C_1-C_4)$-alkyl or $(C_1-C_4)$-alkoxy, $R^{11}$ is hydrogen, carboxy, $(C_1-C_4)$-alkyl, halogen, acylamino, —NHCO-aryl, —NHCO-benzyl or sulfonylamino, $X^6$ is nitro and $X^5$ is hydrogen L is fluoro.

2. The dye mixture according to claim 1, wherein independent of each other in the at least one dye of formula (1)

$R^1$ is hydrogen, methyl or methoxy, $R^2$ is hydrogen, hydroxy, COOH, COO-$(C_1-C_2)$-alkyl, $(C_1-C_2)$-alkyl, —NHCO-$(C_1-C_2)$-alkyl, —NHCO-aryl, —NHCO-benzyl or -NHSO$_2$-$(C_1-C_2)$-alkyl, $R^3$ and $R^4$ is hydrogen, $(C_1-C_2)$-alkyl, $(CH_2)$-phenyl, $CH_2-CH=CH_2$, $(CH_2)_2$-O-$(C_1-C_2)$-alkyl, $(CH_2)_2$-O-phenyl, $(CH_2)_2$-O-benzyl, $(CH_2)_2$-O-$(CH_2)_m$-O-$(C_1-C_2)$-alkyl, $(CH_2)_2$-O-$(CH_2)_m$-O-phenyl, $(CH_2)_2$-O-$(CH_2)_m$-O-benzyl, $(CH_2)_n$-COO-$(C_1-C_2)$-alkyl, $(CH_2)_n$-COO-phenyl, $(CH_2)_n$-COO-benzyl, $(CH_2)_n$-CN, $(CH_2)_n$-COO$(CH_2)_m$-CO-$(C_1-C_2)$-alkyl, $(CH_2)_n$-COO$(CH_2)_m$-CO-benzyl, $(CH_2)_n$-O-CO-$(C_1-C_2)$-alkyl, $(CH_2)_n$-O-CO-phenyl, $(CH_2)_n$-O-CO-benzyl, COO-$(CH_2)_n$-2-furfuryl, $(CH_2)_m$-O-$(CH_2)_n$-2-furfuryl, $CHR^9$—$CH=CH_2$, $CHR^9$-$(CH_2)_p$-O-$(C_1-C_2)$-alkyl, $CHR^9$-$(CH_2)_p$-O-phenyl, $CHR^9$-$(CH_2)_p$-O-benzyl, $CHR^9$-$(CH_2)_p$-O-$(CH_2)_m$-O-$(C_1-C_2)$-alkyl, $CHR^9$-$(CH_2)_p$-O-$(CH_2)_m$-O-phenyl, $CHR^9$-$(CH_2)_p$-O-$(CH_2)_m$-O-benzyl, $CHR^9$-$(CH_2)_p$-COO-$(C_1-C_2)$-alkyl, $CHR^9$-$(CH_2)_p$-COO-phenyl, $CHR^9$-$(CH_2)_p$-COO-benzyl, $CHR^9$-$(CH_2)_p$-CN, $CHR^9$-$(CH_2)_p$-COO$(CH_2)_m$-CO-$(C_1-C_2)$-alkyl, $CHR^9$-$(CH_2)_p$-COO$(CH_2)_m$-CO-phenyl, $CHR^9$-$(CH_2)_p$-COO$(CH_2)_m$-CO-benzyl, $CHR^9$-$(CH_2)_p$-O-CO-$(C_1-C_2)$-alkyl, $CHR^9$-$(CH_2)_p$-O-CO-phenyl or $CHR^9$-$(CH_2)_p$-O-CO-benzyl, wherein $R^9$ is $(C_1-C_4)$-alkyl or $(C_1-C_4)$-alkyl substituted by —OH or halogen, n is 1 or 2, m is 1 or 2 and p is 0 or 1, with the proviso that at least one of $R^3$ and $R^4$ is not hydrogen.

3. The dye mixture according to claim 1, wherein independent of each other in the at least one dye of formula (1)

$R^1$ is hydrogen or methoxy, $R^2$ is hydrogen, methyl or NHCO-$(C_1-C_2)$-alkyl, $R^3$ and $R^4$ is hydrogen, $(C_1-C_2)$-alkyl, $(CH_2)$-phenyl, $CH_2-CH=CH_2$, $(CH_2)_2$-O-$(C_1-C_2)$-alkyl, $(CH_2)_2$-O-phenyl, $(CH_2)_2$-O-benzyl, $(CH_2)$2-O-$(CH_2)_m$-O-$(C_1-C_2)$-alkyl, $(CH_2)_n$-COO-$(C_1-C_2)$-alkyl, $(CH_2)_n$-COO-phenyl, $(CH_2)_n$-COO-benzyl, $(CH_2)_n$-CN, $(CH_2)_n$-COO$(CH_2)_m$-CO-$(C_1-C_2)$-alkyl, $(CH_2)_n$-COO$(CH_2)_m$-CO-benzyl, $(CH_2)_n$-O-CO-$(C_1-C_2)$-alkyl, $(CH_2)_n$-O-CO-phenyl, COO-$(CH_2)_n$-2-furfuryl or $(CH_2)_m$-O-$(CH_2)_n$-2-furfuryl, $CHR^9$-$(CH_2)_p$-COO-$(C_1-C_2)$-alkyl, wherein $R^9$ is $(C_1-C_4)$-alkyl, n is 1 or 2, m is 1 or 2 and with the proviso that at least one of $R^3$ and $R^4$ is not hydrogen.

4. The dye mixture according to claim 1, wherein the at least one dye of formula (1) is a dye of formula (1a)

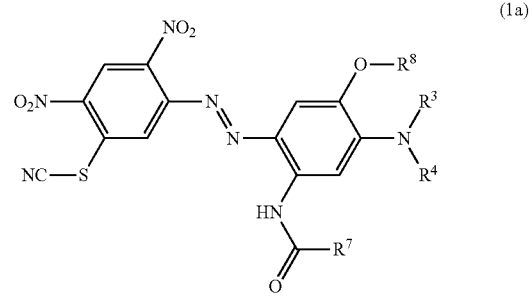

(1a)

wherein independent from each other $R^3$ and $R^4$ is hydrogen, $(C_1-C_2)$-alkyl, $(CH_2)$-phenyl, $CH_2-CH=CH_2$, $(CH_2)_2$-O-$(C_1-C_2)$-alkyl, $(CH_2)_2$-O-phenyl, $(CH_2)_2$-O-benzyl, $(CH_2)_2$-O-$(CH_2)_m$-O-$(C_1-C_2)$-alkyl, $(CH_2)_n$-COO-$(C_1-C_2)$-alkyl, $(CH_2)_n$-COO-phenyl, $(CH_2)_n$-COO-benzyl, $(CH_2)_n$-CN, $(CH_2)_n$-COO$(CH_2)_m$-CO-$(C_1-C_2)$-alkyl, $(CH_2)_n$-COO$(CH_2)_m$-CO-benzyl, $(CH_2)_n$-O-CO-$(C_1-C_2)$-alkyl, $(CH_2)_n$-O-CO-phenyl, COO-$(CH_2)_n$-2-furfuryl, $(CH_2)_m$-O-$(CH_2)_n$-2-furfuryl or $CHR^9$-$(CH_2)_p$-COO-$(C_1-C_2)$-alkyl, wherein $R^9$ is $(C_1-C_4)$-alkyl, n is 1 or 2, m is 1 or 2 and p is 0 or 1, with the proviso that at least one of $R^3$ and $R^4$ is not hydrogen and $R^7$ and $R^8$ is ethyl or methyl.

5. The dye mixture according to claim 1, wherein the at least one dye of formula (1) is a dye of formula (1b),

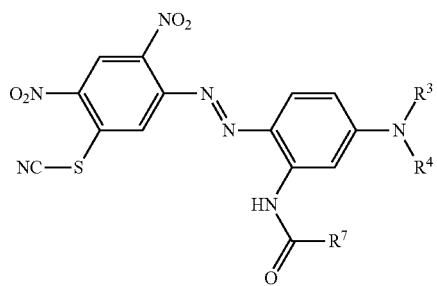

(1b)

wherein independent from each other $R^3$ and $R^4$ is hydrogen, $(C_1-C_2)$-alkyl, $(CH_2)$-phenyl, $CH_2-CH=CH_2$, $(CH_2)_2-O-(C_1-C_2)$-alkyl, $(CH_2)_2-O$-phenyl, $(CH_2)_2-O$-benzyl, $(CH_2)_2-O-(CH_2)_m-O-(C_1-C_2)$-alkyl, $(CH_2)_n$-coo-$(C_1-C_2)$-alkyl, $(CH_2)_n$-COO-phenyl, $(CH_2)_n$-COO-benzyl, $(CH_2)_n$-CN, $(CH_2)_n$-COO$(CH_2)_m$-CO-$(C_1-C_2)$-alkyl, $(CH_2)_n$-COO$(CH_2)_m$-CO-benzyl, $(CH_2)_n$-O-co-$(C_1-C_2)$-alkyl, $(CH_2)_n$-o-co-phenyl, COO-$(CH_2)_n$-2-furfuryl, $(CH_2)_m$-O-$(CH_2)_n$-2-furfuryl or $CHR^9-(CH_2)_p$-coo-$(C_1-C_2)$-alkyl, wherein $R^9$ is $(C_1-C_4)$-alkyl, n is 1 or 2 and m is 1 or 2, p is 0 or 1, with the proviso that at least one of $R^3$ and $R^4$ is not hydrogen and $R^7$ is ethyl or methyl.

6. The dye mixture according to claim 1, wherein the at least one dye of formula (1) is a dye of formula (1c),

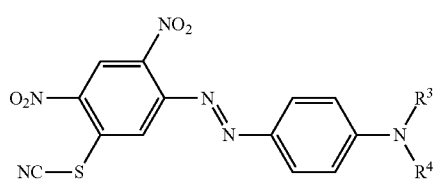

(1c)

wherein independent from each other $R^3$ and $R^4$ is hydrogen, $(C_1-C_2)$-alkyl, $(CH_2)$-phenyl, $CH_2-CH=CH_2$, $(CH_2)_2-O-(C_1-C_2)$-alkyl, $(CH_2)_2-O$-phenyl, $(CH_2)_2-O$-benzyl, $(CH_2)_2-O-(CH_2)_m-O-(C_1-C_2)$-alkyl, $(CH_2)_n$-coo-$(C_1-C_2)$-alkyl, $(CH_2)_n$-COO-phenyl, $(CH_2)_n$-COO-benzyl, $(CH_2)_n$-CN, $(CH_2)_n$-COO$(CH_2)_m$-co-$(C_1-C_2)$-alkyl, $(CH_2)_n$-COO$(CH_2)_m$-CO-benzyl, $(CH_2)_n$-O-co-$(C_1-C_2)$-alkyl, $(CH_2)_n$-O-CO-phenyl, COO-$(CH_2)_n$-2-furfuryl, $(CH_2)_m$-O-$(CH_2)_n$-2-furfuryl or $CHR^9-(CH_2)_p$-coo-$(C_1-C_2)$-alkyl, wherein $R^9$ is $(C_1-C_4)$-alkyl, n is 1 or 2, m is 1 or 2 and p is 0 or 1, with the proviso that at least one of $R^3$ and $R^4$ is not hydrogen.

7. The dye mixture according to claim 1, wherein the at least one dye of formula (1) is selected from the group consisting of

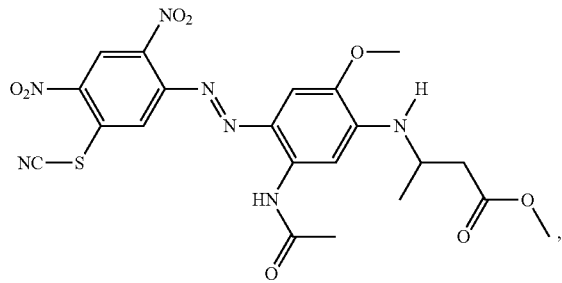

(1-1)

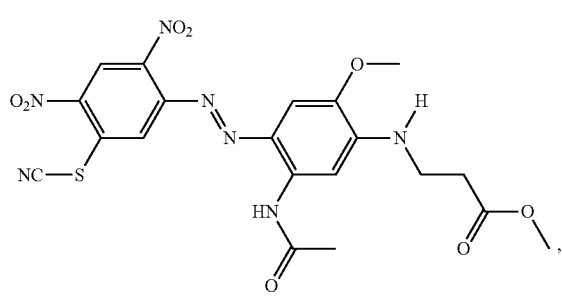

(1-2)

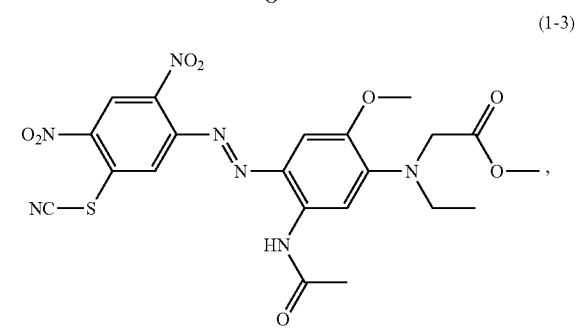

(1-3)

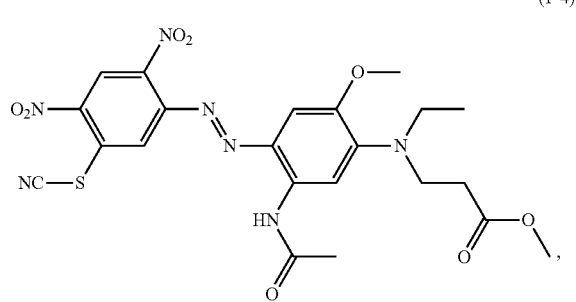

(1-4)

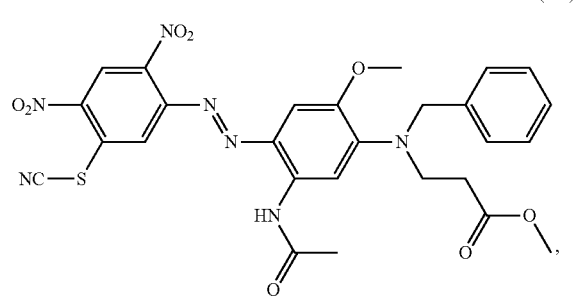

(1-5)

(1-6)
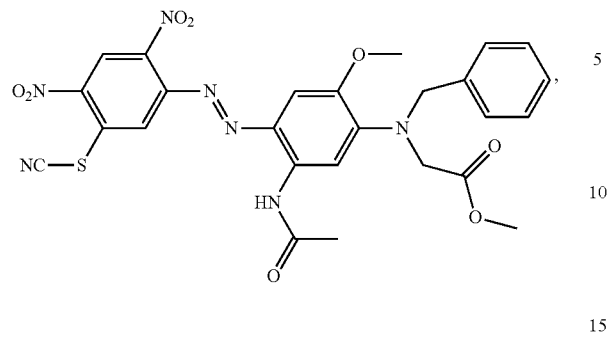
(1-11)
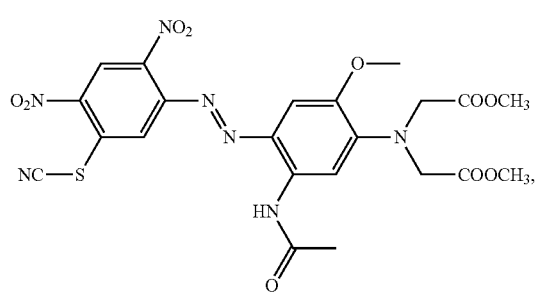
(1-7)
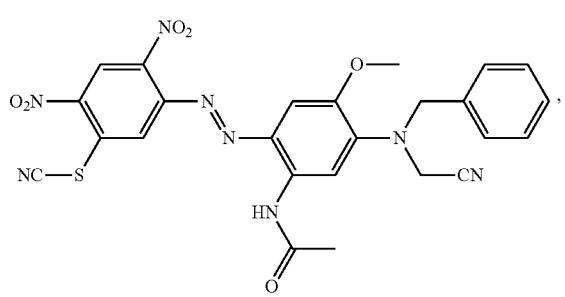
(1-12)
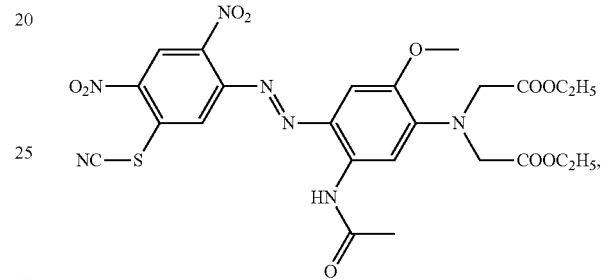
(1-8)
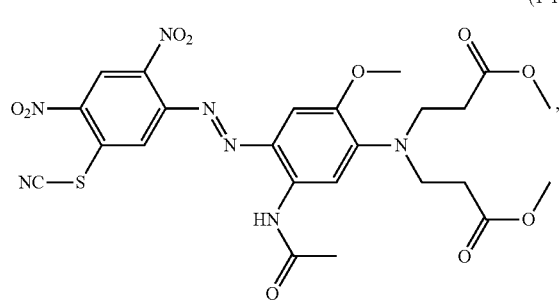
(1-13)
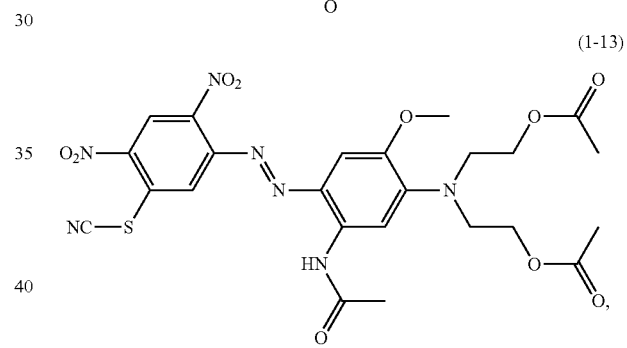
(1-9)
(1-14)
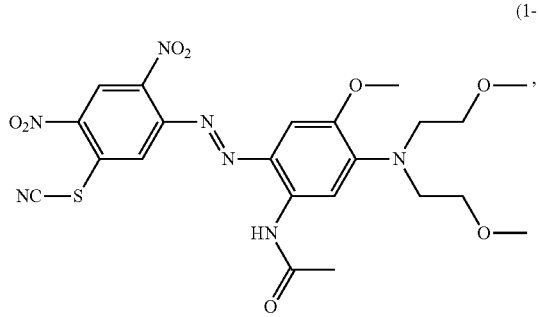
(1-10)
(1-15)
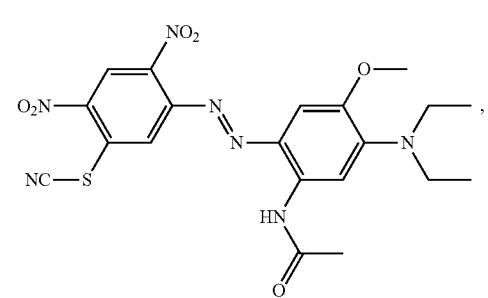

-continued
(1-16)
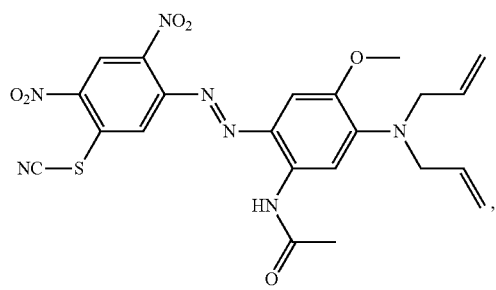
(1-21)
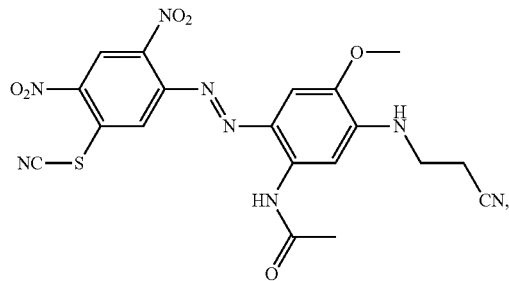
(1-17)
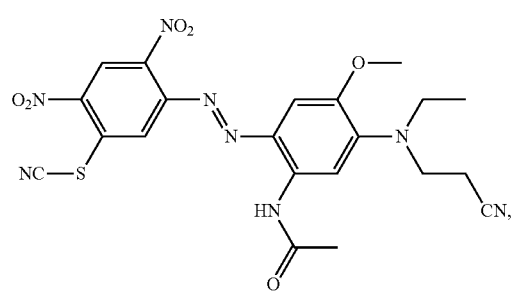
(1-22)
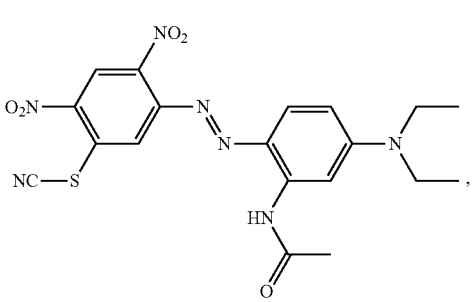
(1-18)
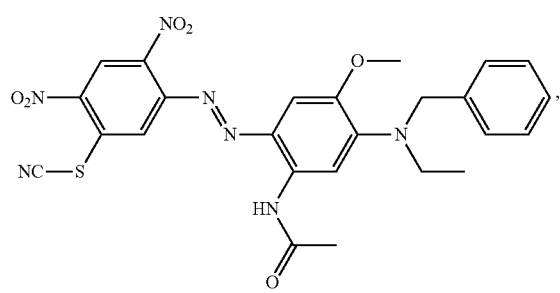
(1-23)
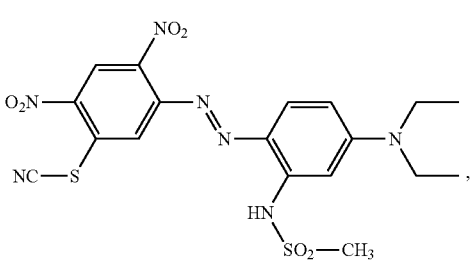
(1-19)
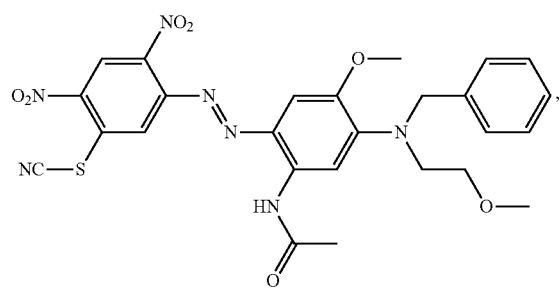
(1-24)
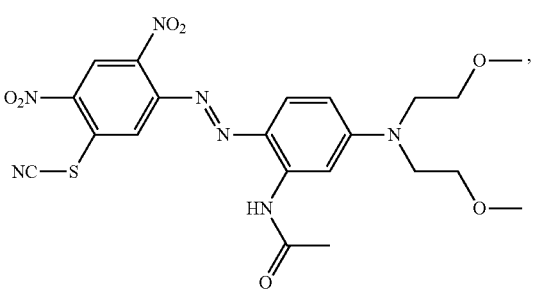
(1-20)
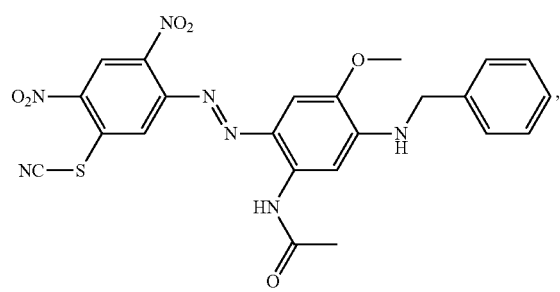
(1-25)
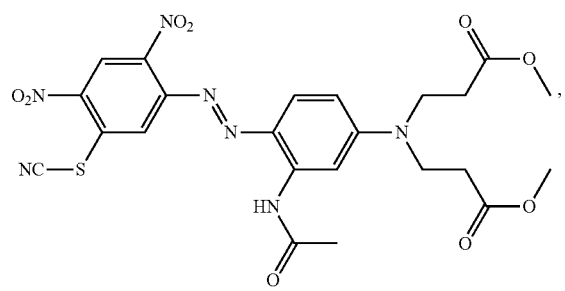

(1-26) 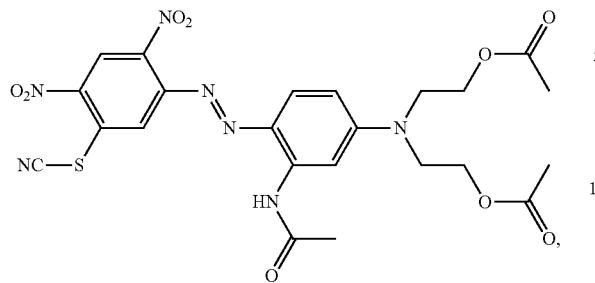
(1-31) 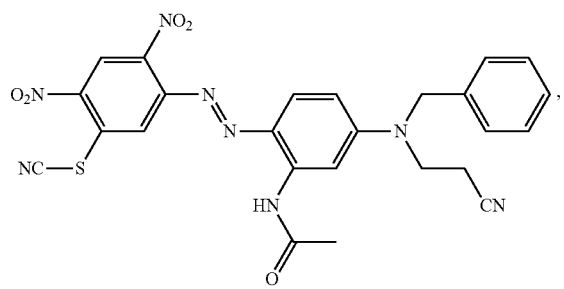
(1-27) 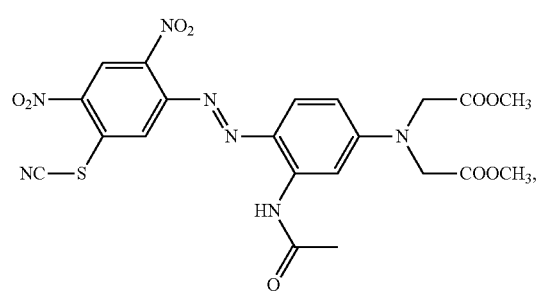
(1-32) 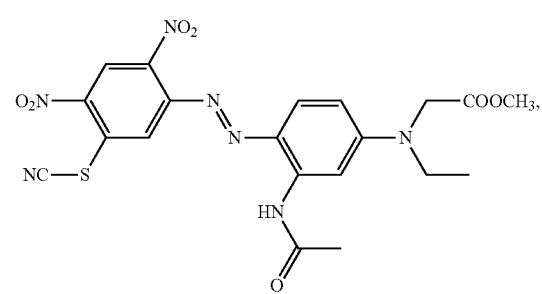
(1-28) 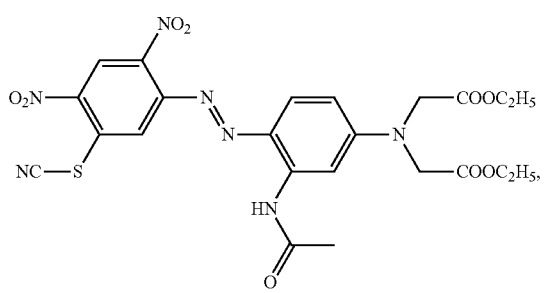
(1-33) 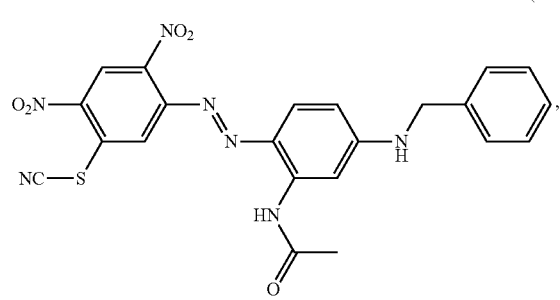
(1-29) 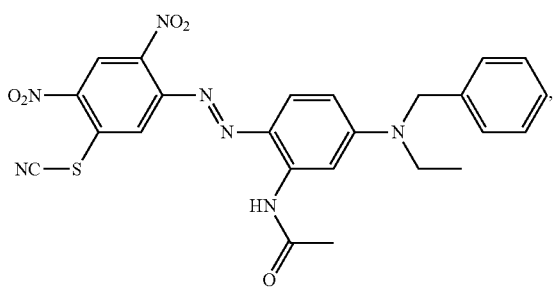
(1-34) 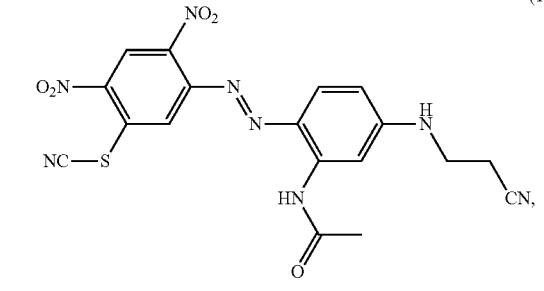
(1-30) 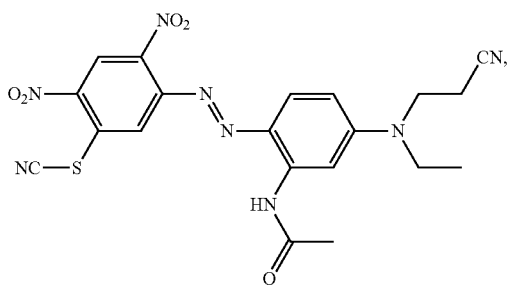
(1-35) 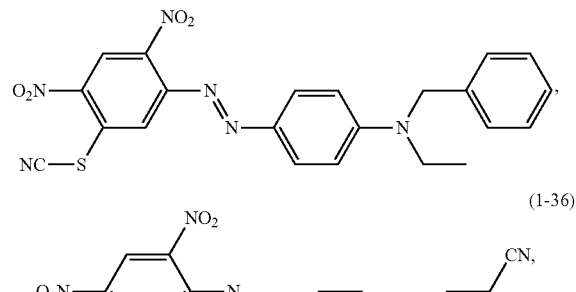
(1-36)

(1-37), (1-38), (1-39), (1-40), (1-41), (1-42), (1-43)

8. The dye mixture according to claim 1, wherein independent of each other in the at least one dye of formula (2)

$R^5$ and $R^6$ is hydrogen, $(C_1-C_2)$-alkyl, $(CH_2)$-phenyl, $CH_2-CH=CH_2$, $(CH_2)_2-O-(C_1-C_2)$-alkyl, $(CH_2)_2-O$-phenyl, $(CH_2)_2-O$-benzyl, $(CH_2)_2-O-(CH_2)_m-O-(C_1-C_2)$-alkyl, $(CH_2)_2-O-(CH_2)_m-O$-phenyl, $(CH_2)_2-O-(CH_2)_m-O$-benzyl, $(CH_2)_n$-coo-$(C_1-C_2)$-alkyl, $(CH_2)_n$-COO-phenyl, $(CH_2)_n$-COO-benzyl, $(CH_2)_n$-CN, $(CH_2)_n$-COO$(CH_2)_m$-coo-$(C_1-C_2)$-alkyl, $(CH_2)_n$-COO$(CH_2)_m$-CO-phenyl, $(CH_2)_n$-COO$(CH_2)_m$-CO-benzyl, $(CH_2)_n$-O-co-$(C_1-C_2)$-alkyl, $(CH_2)_n$-O-CO-phenyl, $(CH_2)_n$-O-CO-benzyl, COO-$(CH_2)_n$-2-furfuryl or $(CH_2)_m$-O-$(CH_2)_n$-2-furfuryl, wherein n is 1 or 2 and m is 1 or 2, with the proviso that at least one of $R^5$ and $R^6$ is not hydrogen, $R^{10}$ is hydrogen, methyl or methoxy, $R^{11}$ is hydrogen, hydroxy, COOH, COO-$(C_1-C_2)$-alkyl, $(C_1-C_2)$-alkyl, NHCO-$(C_1-C_2)$-alkyl, —NHCO-aryl, —NHCO-benzyl or —NHSO2-$(C_1-C_2)$-alkyl, $X^6$ is nitro and $X^5$ is hydrogen L is fluoro.

9. The dye mixture according to claim 1, wherein independent of each other in the at least one dye of formula (2)

$R^5$ and $R^6$ is hydrogen, $(C_1-C_2)$-alkyl, $(CH_2)$-phenyl, $CH_2-CH=CH_2$, $(CH_2)_2-O-(C_1-C_2)$-alkyl, $(CH_2)_2-O$-phenyl, $(CH_2)_2-O$-benzyl, $(CH_2)_2-O-(CH_2)_m-O-(C_1-C_2)$-alkyl, $(CH_2)_n$-COO-$(C_1-C_2)$-alkyl, $(CH_2)_n$-COO-phenyl, $(CH_2)_n$-COO-benzyl, $(CH_2)_n$-CN, $(CH_2)_n$-COO$(CH_2)_m$-CO-$(C_1-C_2)$-alkyl, $(CH_2)_n$-COO$(CH_2)_m$-CO-phenyl, $(CH_2)_n$-COO$(CH_2)_m$-CO-benzyl, $(CH_2)_n$-O-CO-$(C_1-C_2)$-alkyl, $(CH_2)_n$-O-CO-phenyl, COO-$(CH_2)_n$-2-furfuryl or $(CH_2)_m$-O-$(CH_2)_n$-2-furfuryl, wherein n is 1 or 2 and m is 1 or 2, with the proviso that at least one of $R^5$ and $R^6$ is not hydrogen, $R^{10}$ is hydrogen or methoxy, $R^{11}$ is hydrogen, methyl or —NHCO-$(C_1-C_2)$-alkyl, $X^6$ is nitro and $X^5$ is hydrogen L is fluoro.

10. The dye mixture according to claim 1, wherein the at least one dye of formula (2) is a dye of formula (2a),

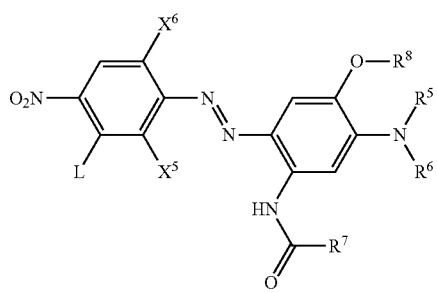

(2a)

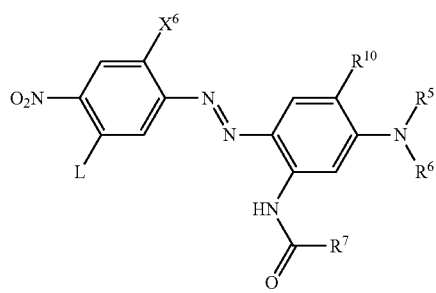

(2d)

wherein independent from each other $R^5$ and $R^6$ are hydrogen, $(C_1-C_2)$-alkyl, $(CH_2)$-phenyl, $CH_2-CH=CH_2$, $(CH_2)_2-O-(C_1-C_2)$-alkyl, $(CH_2)_2-O$-phenyl, $(CH_2)_2-O$-benzyl, $(CH_2)_2-O-(CH_2)_m-O-(C_1-C_2)$-alkyl, $(CH_2)_n-COO-(C_1-C_2)$-alkyl, $(CH_2)_n-COO$-phenyl, $(CH_2)_n-COO$-benzyl, $(CH_2)_n-CN$, $(CH_2)_n-COO(CH_2)_m-CO-(C_1-C_2)$-alkyl, $(CH_2)_n-COO(CH_2)_m-CO$-phenyl, $(CH_2)_n-COO(CH_2)_m-CO$-benzyl, $(CH_2)_n-O-CO-(C_1-C_2)$-alkyl, $(CH_2)_n-O-CO$-phenyl, $COO-(CH_2)_n$-2-furfuryl or $(CH_2)_m-O-(CH_2)_n$-2-furfuryl, wherein n is 1 or 2 and m is 1 or 2, with the proviso that at least one of $R^5$ and $R^6$ is not hydrogen, $R^7$ and $R^8$ is ethyl or methyl, $X^6$ is nitro and $X^5$ is hydrogen L is fluoro.

11. The dye mixture according to claim 1, wherein the at least one dye of formula (2) is a dye of formula (2b),

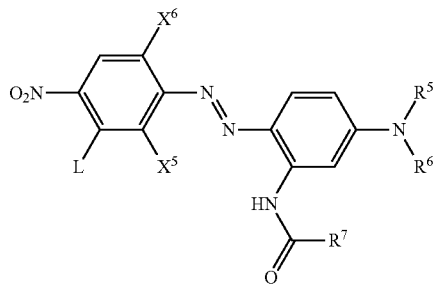

(2b)

$R^5$ and $R^6$ are hydrogen, $(C_1-C_2)$-alkyl, $(CH_2)$-phenyl, $CH_2-CH=CH_2$, $(CH_2)_2-O-(C_1-C_2)$-alkyl, $(CH_2)_2-O$-phenyl, $(CH_2)_2-O$-benzyl, $(CH_2)_2-O-(CH_2)_m-O-(C_1-C_2)$-alkyl, $(CH_2)_n-COO-(C_1-C_2)$-alkyl, $(CH_2)_n-COO$-phenyl, $(CH_2)_n-COO$-benzyl, $(CH_2)_n-CN$, $(CH_2)_n-COO(CH_2)_m-CO-(C_1-C_2)$-alkyl, $(CH_2)_n-COO(CH_2)_m-CO$-phenyl, $(CH_2)_n-COO(CH_2)_m-CO$-benzyl, $(CH_2)_n-O-CO-(C_1-C_2)$-alkyl, $(CH_2)_n-O-CO$-phenyl, $COO-(CH_2)_n$-2-furfuryl or $(CH_2)_m-O-(CH_2)_n$-2-furfuryl, wherein n is 1 or 2 and m is 1 or 2, with the proviso that at least one of $R^5$ and $R^6$ is not hydrogen, $R^7$ is ethyl or methyl and $X^6$ is nitro and $X^5$ is hydrogen L is fluoro.

12. The dye mixture according to claim 1, wherein the at least one dye of formula (2) is a dye of formula (2d), wherein independent from each other $R^5$ and $R^6$ is hydrogen, $(C_1-C_2)$-alkyl, $(CH_2)$-phenyl, $CH_2-CH=CH_2$, $(CH_2)_2-O-(C_1-C_2)$-alkyl, $(CH_2)_2-O$-phenyl, $(CH_2)_2-O$-benzyl, $(CH_2)_2-O-(CH_2)_m-O-(C_1-C_2)$-alkyl, $(CH_2)_n-COO-(C_1-C_2)$-alkyl, $(CH_2)_n-COO$-phenyl, $(CH_2)_n-COO$-benzyl, $(CH_2)_n-CN$, $(CH_2)_n-COO(CH_2)_m-CO-(C_1-C_2)$-alkyl, $(CH_2)_n-COO(CH_2)_m-CO$-phenyl, $(CH_2)_n-COO(CH_2)_m-CO$-benzyl, $(CH_2)_n-O-CO-(C_1-C_2)$-alkyl, $(CH_2)_n-O-CO$-phenyl, $COO-(CH_2)_n$-2-furfuryl or $(CH_2)_m-O-(CH_2)_n$-2-furfuryl, wherein n is 1 or 2 and m is 1 or 2 with the proviso that at least one of $R^5$ and $R^6$ is not hydrogen, $R^7$ is ethyl or methyl, $R^{10}$ is hydrogen, methyl or methoxy, and is nitro L is fluoro.

13. The dye mixture according to claim 1, wherein the at least one dye of formula (2) is selected from the group consisting of

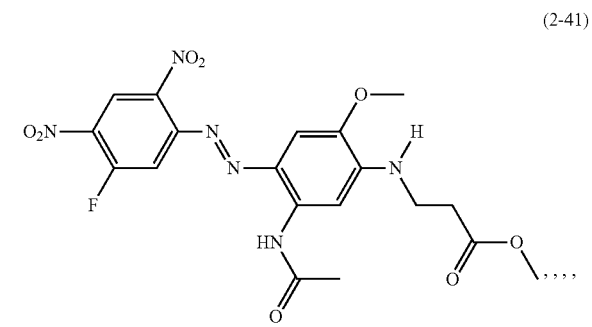

(2-41)

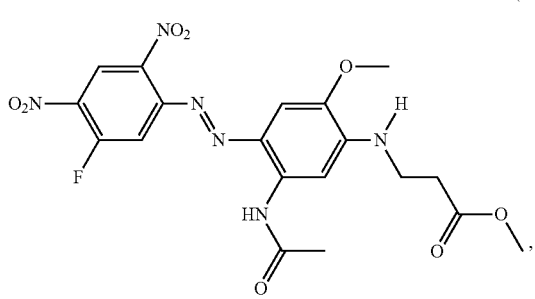

(2-41)

(2-42)
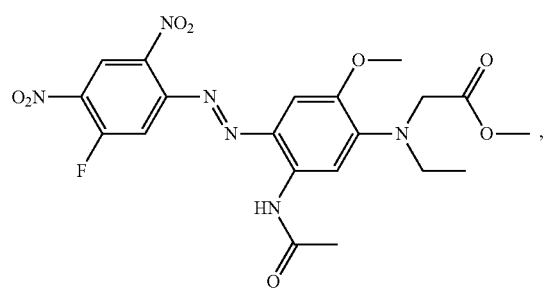
(2-43)
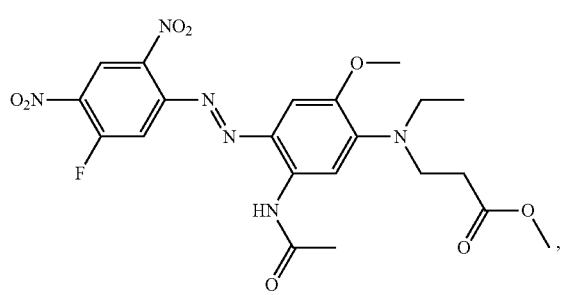
(2-44)
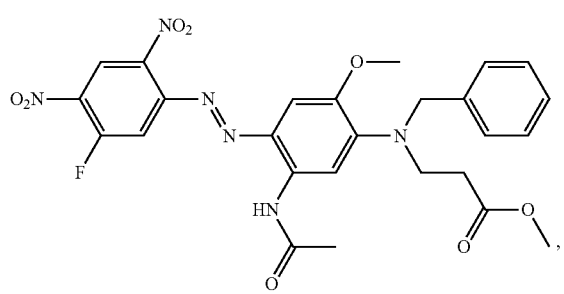
(2-45)
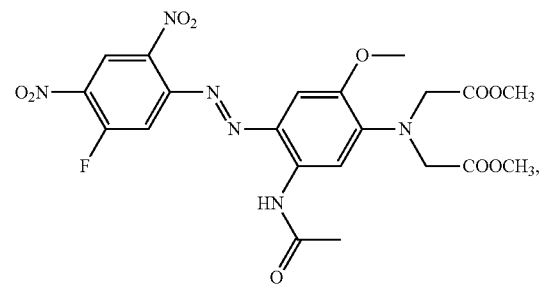
(2-46)
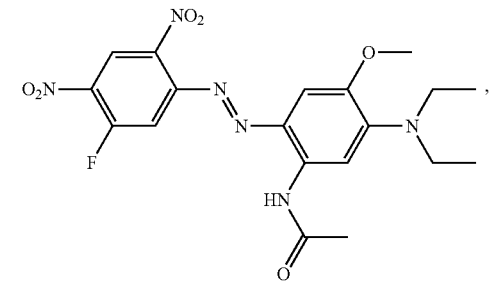
(2-47)
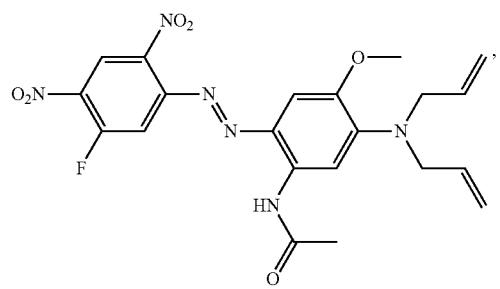
(2-48)
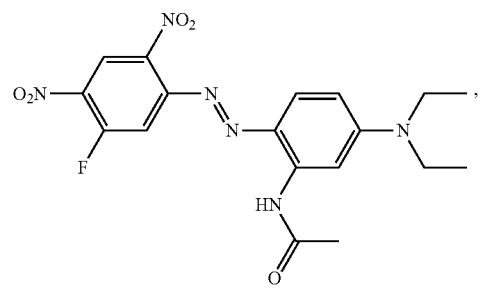
(2-49)
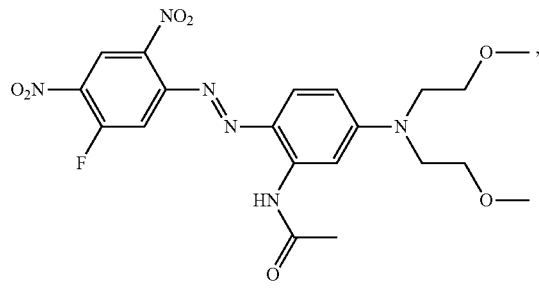
(2-50)
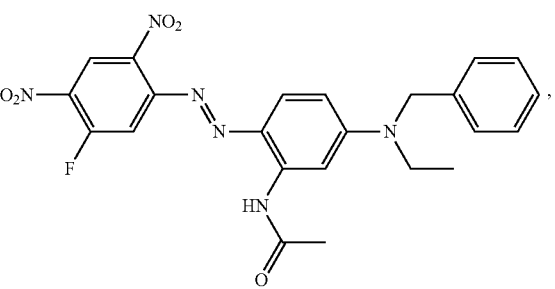
(2-51)
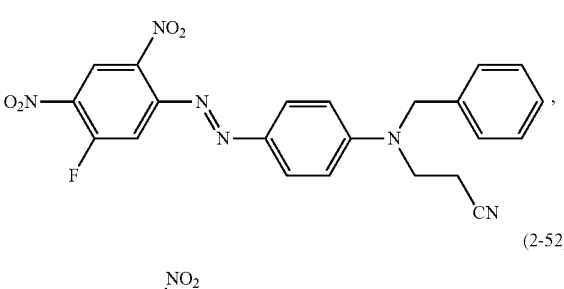
(2-52)
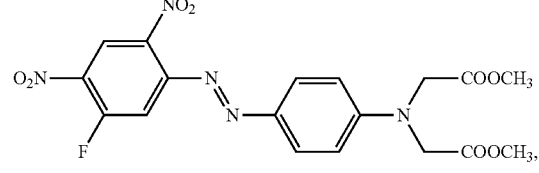

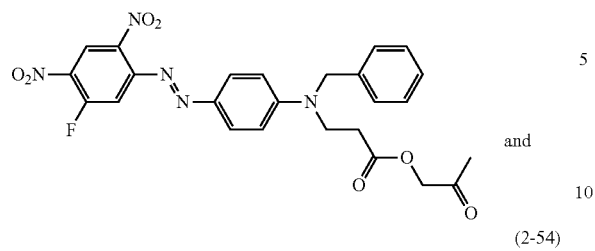
(2-53)
and
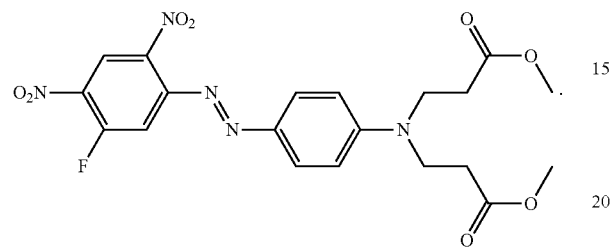
(2-54)
\* \* \* \* \*